US012491959B2

United States Patent
Takayama et al.

(10) Patent No.: US 12,491,959 B2
(45) Date of Patent: Dec. 9, 2025

(54) ELECTRICAL DEVICE AND ROTATIONAL DEVICE FOR HUMAN-POWERED VEHICLE

(71) Applicant: SHIMANO INC., Sakai (JP)

(72) Inventors: Hitoshi Takayama, Sakai (JP); Junta Hamamoto, Sakai (JP); Syoma Nakata, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 18/324,172

(22) Filed: May 26, 2023

(65) Prior Publication Data

US 2024/0391551 A1 Nov. 28, 2024

(51) Int. Cl.
*B62J 45/421* (2020.01)
*B62J 45/414* (2020.01)

(52) U.S. Cl.
CPC .......... *B62J 45/421* (2020.02); *B62J 45/414* (2020.02)

(58) Field of Classification Search
CPC .............................. B62J 45/421; B62J 45/414
See application file for complete search history.

(56) References Cited

U.S. PATENT DOCUMENTS

| 2002/0047715 | A1  |   | 4/2002 | Holm     |            |
|--------------|-----|---|--------|----------|------------|
| 2016/0152302 | A1  | * | 6/2016 | Nishino  | B62M 25/08 |
|              |     |   |        |          | 701/2      |
| 2021/0194332 | A1  | * | 6/2021 | Gallagher| H02K 7/116 |

FOREIGN PATENT DOCUMENTS

| CN | 210625685 U | * | 5/2020 |
| JP | 2002-082125 |   | 3/2002 |

* cited by examiner

*Primary Examiner* — Vicky A Johnson
(74) *Attorney, Agent, or Firm* — MORI & WARD, LLP

(57) ABSTRACT

An electrical device of a rotational device for a human-powered vehicle comprises a wireless communicator and an electronic controller. The wireless communicator is configured to wirelessly communicate with an additional electrical device. The electronic controller is electrically connected to the wireless communicator to wirelessly communicate with the additional electrical device via the wireless communicator. The electronic controller is configured to control the wireless communicator to execute pairing in response to a reverse rotation of the rotational device.

19 Claims, 30 Drawing Sheets

ELECTRICAL DEVICE AND ROTATIONAL DEVICE FOR HUMAN-POWERED VEHICLE

BACKGROUND

Technical Field

The present invention relates to an electrical device and a rotational device for a human-powered vehicle.

Background Information

A human-powered vehicle includes a device configured to rotate relative to a vehicle body. For example, the device wirelessly communicates with an additional device. One of objects of the present disclosure is to execute pairing of a wireless communicator with a comparatively simple structure.

SUMMARY

In accordance with a first aspect of the present invention, an electrical device of a rotational device for a human-powered vehicle comprises a wireless communicator and an electronic controller. The wireless communicator is configured to wirelessly communicate with an additional electrical device. The electronic controller is electrically connected to the wireless communicator to wirelessly communicate with the additional electrical device via the wireless communicator. The electronic controller is configured to control the wireless communicator to execute pairing in response to a reverse rotation of the rotational device.

With the electrical device according to the first aspect, since the electronic controller is configured to control the wireless communicator to execute pairing in response to the reverse rotation of the rotational device, it is possible to use the reverse rotation of the rotational device to execute pairing. Thus, it is possible to easily execute pairing of the wireless communicator with a comparatively simple structure.

In accordance with a second aspect of the present invention, the electrical device according to the first aspect is configured so that the electronic controller is configured to control the wireless communicator to execute pairing in a case where an amount of reverse rotation of the rotational device is greater than or equal to a rotation threshold.

With the electrical device according to the second aspect, it is possible to execute pairing of the wireless communicator using the reverse rotation of the rotational device while restricting pairing from being unintentionally executed.

In accordance with a third aspect of the present invention, the electrical device according to the second aspect is configured so that the electronic controller is configured to control the wireless communicator to execute pairing in a case where the amount of reverse rotation of the rotational device is greater than or equal to the rotation threshold before a determination time elapses.

With the electrical device according to the third aspect, it is possible to reliably execute pairing of the wireless communicator using the reverse rotation of the rotational device while restricting pairing from being unintentionally executed.

In accordance with a fourth aspect of the present invention, the electrical device according to any one of the first to third aspects further comprises a position sensor configured to sense a rotational position of the rotational device.

With the electrical device according to the fourth aspect, it is possible to use the rotational position sensed by the position sensor for executing pairing.

In accordance with a fifth aspect of the present invention, the electrical device according to the fourth aspect is configured so that the electronic controller is electrically connected to the position sensor to obtain the rotational position sensed by the position sensor.

With the electrical device according to the fifth aspect, it is possible to reliably use the rotational position sensed by the position sensor for executing pairing.

In accordance with a sixth aspect of the present invention, the electrical device according to the fourth or fifth aspect is configured so that the electronic controller is configured to determine whether the rotational device rotates in a reverse direction based on the rotational position sensed by the position sensor.

With the electrical device according to the sixth aspect, it is possible to determine the reverse rotation using the rotational position sensed by the position sensor.

In accordance with a seventh aspect of the present invention, the electrical device according to any one of the fourth to sixth aspects is configured so that the position sensor includes an accelerometer. The accelerometer is configured to sense radial acceleration and rotational acceleration. The radial acceleration is defined in a radial direction with respect to a rotational axis of the rotational device. The rotational acceleration is defined in a rotational direction with respect to the rotational axis. The electronic controller is configured to determine whether the rotational device rotates in the reverse direction based on the radial acceleration and the rotational acceleration.

With the electrical device according to the seventh aspect, it is possible to determine the reverse rotation with a comparatively simple structure.

In accordance with an eighth aspect of the present invention, the electrical device according to the seventh aspect is configured so that the electronic controller is configured to obtain the rotational position based on the radial acceleration and the rotational acceleration which are sensed by the accelerometer. The electronic controller is configured to determine whether the rotational device rotates in the reverse direction based on the rotational position obtained based on the radial acceleration and the rotational acceleration.

With the electrical device according to the eighth aspect, it is possible to reliably determine the reverse rotation using the rotational position sensed by the position sensor.

In accordance with a ninth aspect of the present invention, the electrical device according to the seventh or eighth aspect is configured so that the electronic controller is configured to obtain an amount of reverse rotation of the rotational device based on the radial acceleration and the rotational acceleration.

With the electrical device according to the ninth aspect, it is possible to reliably execute pairing using the amount of reverse rotation.

In accordance with a tenth aspect of the present invention, the electrical device according to the ninth aspect is configured so that the electronic controller is configured to start to obtain the amount of reverse rotation of the rotational device based on the radial acceleration and the rotational acceleration in a case where the electronic controller recognizes the reverse rotation of the rotational device.

With the electrical device according to the tenth aspect, it is possible to improve accuracy of the amount of reverse rotation.

In accordance with an eleventh aspect of the present invention, the electrical device according to any one of the first to tenth aspects is configured so that the electronic controller is configured to control the wireless communicator to wirelessly transmit a pairing signal in response to the reverse rotation of the rotational device.

With the electrical device according to the eleventh aspect, it is possible to reliably execute pairing of the wireless communicator.

In accordance with a twelfth aspect of the present invention, the electrical device according to the eleventh aspect is configured so that the pairing signal includes an advertisement signal. The electronic controller is configured to control the wireless communicator to wirelessly transmit the advertisement signal at advertising intervals in response to the reverse rotation of the rotational device.

With the electrical device according to the twelfth aspect, it is possible to reliably execute advertising in response to the reverse rotation.

In accordance with a thirteenth aspect of the present invention, a rotational device of a human-powered vehicle comprises a crank arm and the electrical device according to any one of the first to twelfth aspects.

With the electrical device according to the thirteenth aspect, it is possible to apply the electrical device to the crank arm.

In accordance with a fourteenth aspect of the present invention, the electrical device according to the thirteenth aspect is configured so that the electrical device is at least partially provided to the crank arm.

With the electrical device according to the fourteenth aspect, it is possible to reliably obtain the rotational position of the crank arm using the electrical device.

In accordance with a fifteenth aspect of the present invention, the electrical device according to the thirteenth or fourteenth aspect further comprises a crank axle and a sprocket. The crank arm is secured to the crank axle.

With the electrical device according to the fifteenth aspect, it is possible to apply the electrical device to a crank assembly.

In accordance with a sixteenth aspect of the present invention, the electrical device according to the fifteenth aspect is configured so that the electrical device is at least partially provided to at least one of the crank axle, the crank arm, and the sprocket.

With the electrical device according to the sixteenth aspect, it is possible to reliably obtain the rotational position of at least one of the crank axle, the crank arm, and the sprocket using the electrical device.

In accordance with a seventeenth aspect of the present invention, a rotational device for a human-powered vehicle comprises a pedal axle, a pedal body rotatably coupled to the pedal axle, and the electrical device according to any one of the first to twelfth aspects.

With the electrical device according to the seventeenth aspect, it is possible to apply the electrical device to a pedal.

In accordance with an eighteenth aspect of the present invention, the electrical device according to the seventeenth aspect is configured so that the electrical device is at least partially provided to at least one of the pedal axle and the pedal body.

With the electrical device according to the eighteenth aspect, it is possible to reliably obtain the rotational position of at least one of the pedal axle and the pedal body using the electrical device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
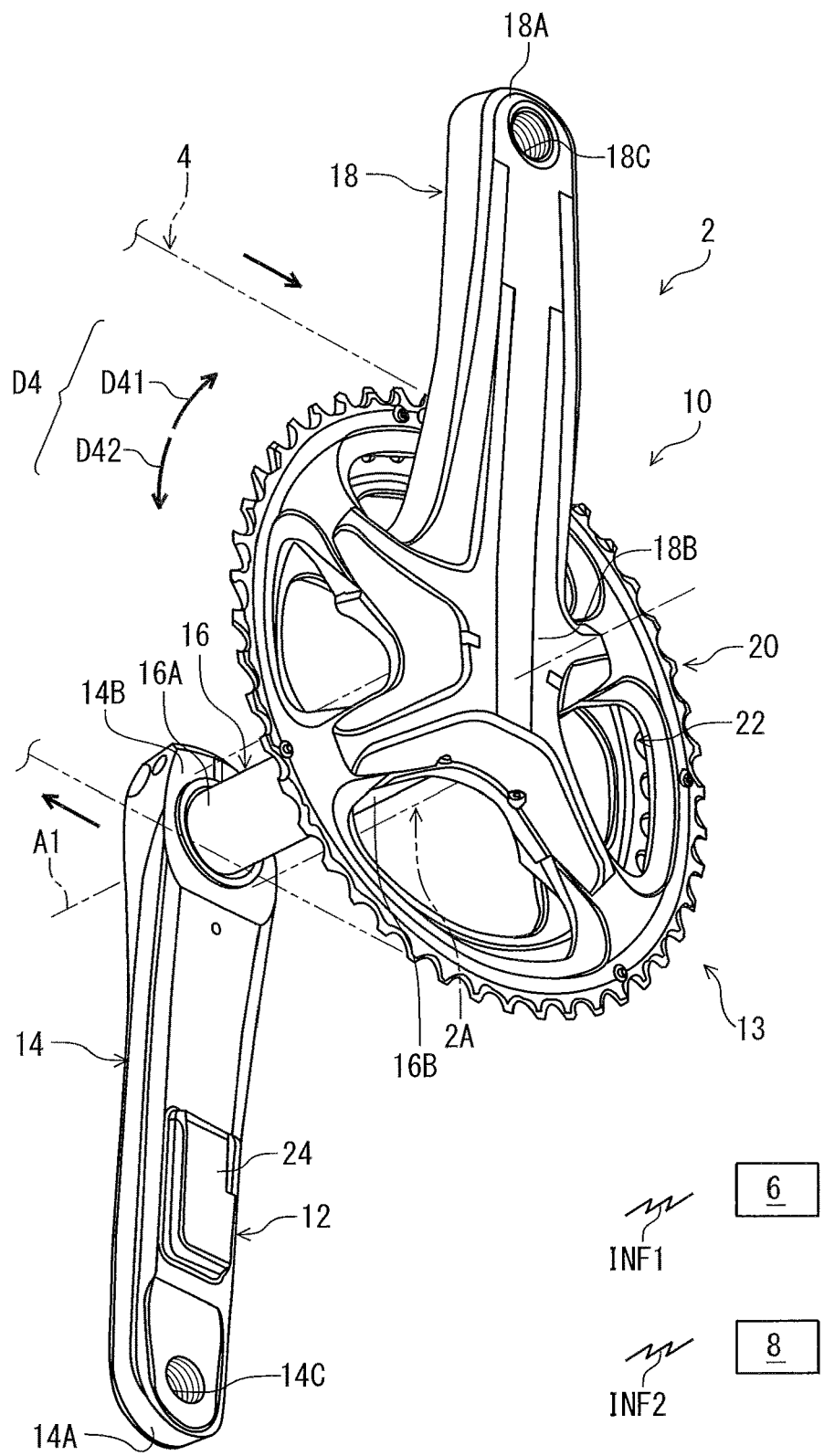
FIG. 1 is a perspective view of a rotational device of a human-powered vehicle in accordance with a first embodiment.

The embodiments will now be described with reference to the accompanying drawings, wherein like reference numerals designate corresponding or identical elements throughout the various drawings.

First Embodiment

As seen in FIG. 1, a human-powered vehicle 2 includes a rotational device 10 in accordance with one of embodiments. The rotational device 10 of the human-powered vehicle 2 comprises an electrical device 12. Examples of the rotational device 10 include a crank assembly, a pedal, a hub assembly, and a wheel. Examples of the electrical device 12 includes a crank power meter, a pedal power meter, a hub power meter, a sensor provided to a crank assembly, and a sensor provided to a hub assembly or a wheel. Examples of the sensor provided to the crank assembly includes a rotational speed sensor. Examples of the rotational speed sensor include a cadence sensor. Examples of the sensor provided to the hub assembly or the wheel include a speed sensor. In the present embodiment, the rotational device 10 includes a crank assembly 13. However, the rotational device 10 can include other devices such as a pedal, a hub assembly, and a wheel if needed or desired.

In the present application, the term "human-powered vehicle" includes a vehicle to travel with a motive power including at least a human power of a user who rides the vehicle. The human-powered vehicle includes a various kind of bicycles such as a mountain bike, a road bike, a city bike, a cargo bike, a hand bike, and a recumbent bike. Furthermore, the human-powered vehicle includes an electric bike called as an E-bike. The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only a driving source as motive power. Examples of the driving source include an internal-combustion engine and an electric motor. Generally, a light road vehicle, which includes a vehicle that does not require a driver's license for a public road, is assumed as the human-powered vehicle.

As seen in FIG. 1, the rotational device 10 is rotatable relative to a vehicle body 2A of the human-powered vehicle 2 about a rotational axis A1. The rotational device 10 is rotatable relative to the vehicle body 2A of the human-powered vehicle 2 about the rotational axis A1 in a driving rotational direction D41 during pedaling. The rotational device 10 of the human-powered vehicle 2 comprises a crank arm 14. The rotational device 10 further comprises a crank axle 16. The crank arm 14 is secured to the crank axle 16. The rotational device 10 further comprises a crank arm 18. The crank assembly 13 includes the crank arm 14, the crank axle 16, and the crank arm 18. The crank arm 18 is secured to the crank axle 16. The crank arm 14, the crank axle 16, and the crank arm 18 are rotatable relative to the vehicle body 2A of the human-powered vehicle 2 in the driving rotational direction D41. The rotational device 10 is rotatable relative to the vehicle body 2A about the rotational axis A1 in a crank rotational direction D4. The crank rotational direction D4 includes the driving rotational direction D41 and a reverse direction D42. The reverse direction D42 is an opposite direction of the driving rotational direction D41.

The rotational device 10 further comprises a sprocket 20. The rotational device 10 further comprises a sprocket 22. The sprocket 20 is configured to engage with a chain 4. The sprocket 22 is configured to engage with the chain 4. The sprocket 20 or 22 is configured to transmit a driving force to another sprocket such as a rear sprocket via the chain 4. The sprocket 20 is secured to at least one of the crank axle 16 and the crank arm 18. The sprocket 22 is secured to at least one of the crank axle 16, the crank arm 18, and the sprocket 20. The sprocket 22 can be omitted from the rotational device 10 if needed or desired.

The crank axle 16 includes a first axle end 16A and a second axle end 16B. The crank axle 16 extends between the first axle end 16A and the second axle end 16B along the rotational axis A1. The crank arm 14 is secured to the first axle end 16A. The crank arm 18 is secured to the second axle end 16B.

The crank arm 14 includes has a first end 14A and a second end 14B. The crank arm 14 extends between the first end 14A and the second end 14B. The first end 14A includes a pedal securing hole 14C to which a pedal is attachable. The second end 14B is secured to the first axle end 16A of the crank axle 16. Examples of the pedal include a binding pedal, a clipless pedal, and a general pedal.

The crank arm 18 includes has a first end 18A and a second end 18B. The crank arm 18 extends between the first end 18A and the second end 18B. The first end 18A includes a pedal securing hole 18C to which a pedal is attachable. The second end 18B is secured to the first axle end 16A of the crank axle 16.

In the present embodiment, the crank arm 14 is a left crank arm while the crank arm 18 is a right crank arm. However, the crank arm 14 can be a right crank arm if needed or desired. The crank arm 18 can be a left crank arm if needed or desired.

In the present application, the following directional terms "front," "rear," "forward," "rearward," "left," "right," "transverse," "upward" and "downward" as well as any other similar directional terms refer to those directions which are determined on the basis of the user who is in the user's standard position in the human-powered vehicle 2 with facing a handlebar or steering. Examples of the user's standard position include a saddle and a seat. Accordingly, these terms, as utilized to describe the rotational device 10 or other components, should be interpreted relative to the human-powered vehicle 2 equipped with the rotational device 10 or other components as used in an upright riding position on a horizontal surface.

The electrical device 12 is at least partially provided to at least one of the crank axle 16, the crank arm 14, and the sprocket 20 or 22. The electrical device 12 is at least partially provided to the crank arm 14. In the present embodiment, the electrical device 12 is entirely provided to the crank arm 14. The electrical device 12 is provided between the first end 14A and the second end 14B. The electrical device 12 is attached to an outer surface of the crank arm 14. However, the electrical device 12 can be at least partially provided inside the crank arm 14 if needed or desired. The electrical device 12 can be at least partially provided to at least one of the crank axle 16, the crank arm 18, and the sprocket 20 or 22 if needed or desired.

Figure 2:
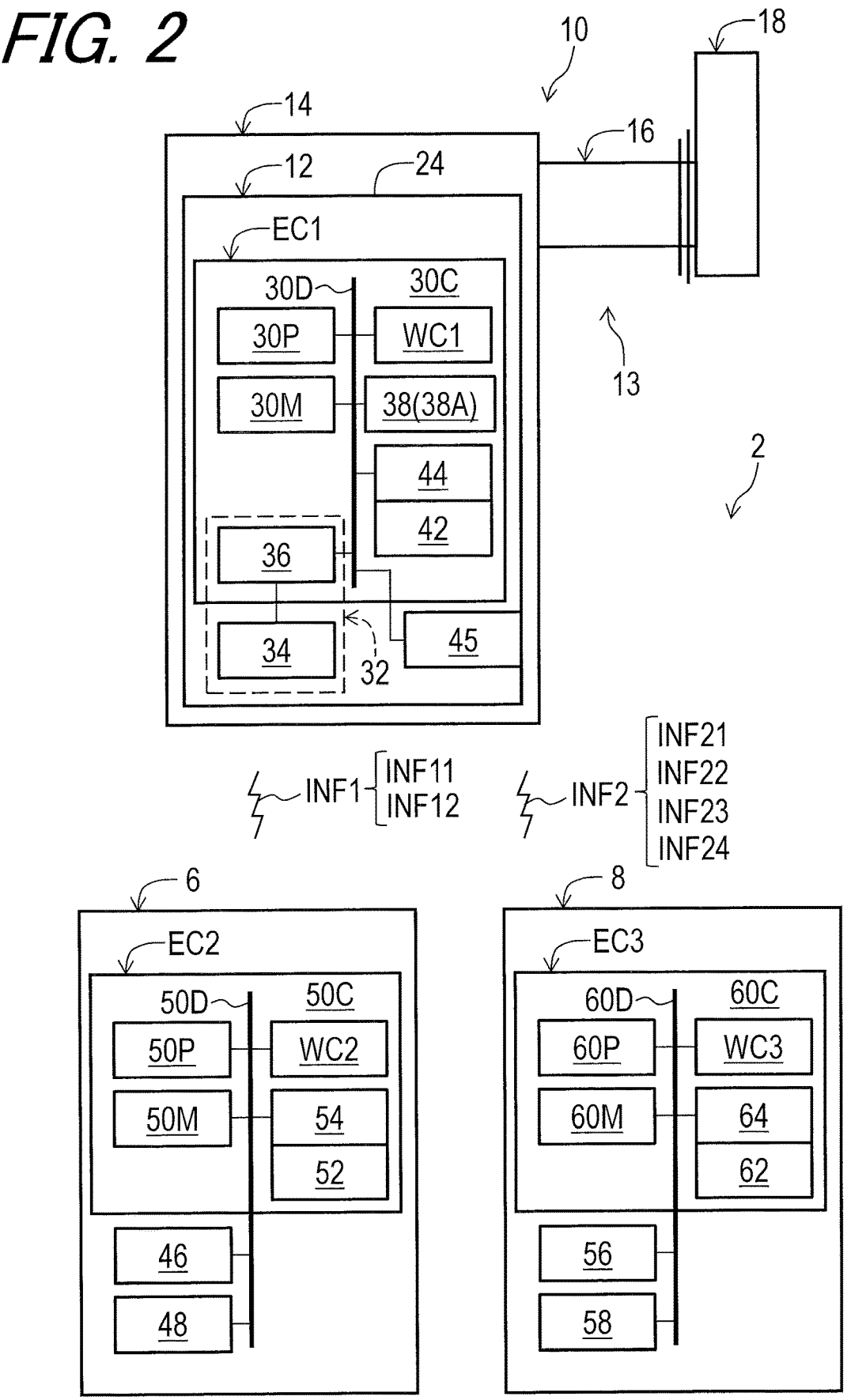
FIG. 2 is a schematic block diagram of the rotational device illustrated in FIG. 1.

As seen in FIG. 2, the electrical device 12 of the rotational device 10 for the human-powered vehicle 2 comprises a wireless communicator WC1 and an electronic controller EC1. The wireless communicator WC1 is configured to wirelessly communicate with an additional electrical device 6. The wireless communicator WC1 is configured to wirelessly communicate with an additional wireless communicator WC2 of the additional electrical device 6. The electronic controller EC1 is electrically connected to the wireless communicator WC1. The electronic controller EC1 is electrically connected to the wireless communicator WC1 to wirelessly communicate with the additional electrical device 6 via the wireless communicator WC1. The electrical device 12 includes a housing 24. The wireless communicator WC1 and the electronic controller EC1 are provided in the housing 24. As seen in FIG. 1, the housing 24 is attached to the crank assembly 13. The housing 24 is attached to the crank arm 14.

As seen in FIG. 2, the wireless communicator WC1 is configured to wirelessly transmit rotational information INF1 relating to the rotational device 10. The rotational information INF1 includes at least one of: power applied to the rotational device 10; a deformation amount of the rotational device 10; a force applied to the rotational device 10; torque applied to the rotational device 10; a rotational position of the rotational device 10; and a rotational speed of the rotational device 10.

In the present embodiment, the rotational information INF1 includes power INF11 applied to the rotational device 10 and a rotational speed INF12 of the rotational device 10. The electronic controller EC1 is configured to calculate the power INF11 based on the torque applied to the rotational device 10 and the rotational speed INF12 of the rotational device 10. The rotational speed INF12 is a total number of rotations of the rotational device 10 per unit time. The rotational speed INF12 includes a cadence in a case where the rotational device 10 includes the crank arm 14. However, the rotational information INF1 is not limited to the power INF11 and the rotational speed INF12.

The electronic controller EC1 is configured to control the wireless communicator WC1 to wirelessly transmit the power INF11 obtained based on the deformation amount sensed by the force sensor 32. The electronic controller EC1 is configured to control the wireless communicator WC1 to wirelessly transmit the rotational speed INF12 obtained based on the radial acceleration AL1 and the rotational acceleration AL2 sensed by the position sensor 38.

As seen in FIG. 2, the electronic controller EC1 includes a hardware processor 30P, a hardware memory 30M, and a circuit board 30C, and a bus 30D. The hardware processor 30P is coupled to the hardware memory 30M. The hardware memory 30M is coupled to the hardware processor 30P. The hardware processor 30P and the hardware memory 30M are electrically mounted on the circuit board 30C. The hardware processor 30P is electrically connected to the hardware memory 30M via the circuit board 30C and the bus 30D. The hardware memory 30M is electrically connected to the hardware processor 30P via the circuit board 30C and the bus 30D. The bus 30D is provided on the circuit board 30C. For example, the electronic controller EC1 includes a semiconductor. The hardware processor 30P includes a semiconductor. The hardware memory 30M includes a semiconductor. However, the electronic controller EC1 can be free of a semiconductor if needed or desired. The hardware processor 30P can be free of a semiconductor if needed or desired. The hardware memory 30M can be free of a semiconductor if needed or desired.

For example, the hardware processor 30P includes at least one of a central processing unit (CPU), a micro processing unit (MPU), and a memory controller. The hardware memory 30M is electrically connected to the hardware processor 30P. For example, the hardware memory 30M includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a magnetic disc. The hardware memory 30M includes storage areas each having an address. The hardware processor 30P is configured to control the hardware memory 30M to store data in the storage areas of the hardware memory 30M and reads data from the storage areas of the hardware memory 30M. The hardware memory 30M can also be referred to as a computer-readable storage medium 30M.

The electronic controller EC1 is programed to execute at least one control algorithm of the electrical device 12. The hardware memory 30M stores at least one program including at least one program instruction. The at least one program is read into the hardware processor 30P, and thereby the at least one control algorithm of the electrical device 12 is executed based on the at least one program. The electronic controller EC1 can also be referred to as an electronic controller circuit or circuitry EC1. The electronic controller EC1 can also be referred to as a hardware electronic controller EC1.

The structure of the electronic controller EC1 is not limited to the above structure. The structure of the electronic controller EC1 is not limited to the hardware processor 30P, the hardware memory 30M, and the bus 30D. The electronic controller EC1 can be realized by hardware alone or a combination of hardware and software. The hardware processor 30P and the hardware memory 30M can be integrated as a one chip such as an application specific integrated circuit (ASIC) or a field programmable gate array (FPGA). The hardware processor 30P and the hardware memory 30M can be separate chips. The electronic controller EC1 can be at least two electronic controllers which are separately provided.

The at least one control algorithm of the electrical device 12 can be executed by the at least two electronic controllers if needed or desired. The electronic controller EC1 can include at least two hardware processors which are separately provided. The electronic controller EC1 can include at least two hardware memories which are separately provided. The at least one control algorithm of the electrical device 12 can be executed by the at least two hardware processors if needed or desired. The at least one control algorithm of the electrical device 12 can be stored in the at least two hardware memories if needed or desired. The electronic controller EC1 can include at least two circuit boards which are separately provided if needed or desired. The electronic controller EC1 can include at least two buses which are separately provided if needed or desired.

As seen in FIG. 2, the wireless communicator WC1 is electrically connected to the hardware processor 30P and the hardware memory 30M with the circuit board 30C and the bus 30D. The wireless communicator WC1 is electrically mounted on the circuit board 30C. The wireless communicator WC1 includes a signal transmitting circuit or circuitry, a signal receiving circuit or circuitry, and an antenna. Thus, the wireless communicator WC1 can also be referred to as a wireless communicator circuit or circuitry WC1.

The wireless communicator WC1 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the wireless communicator WC1 is configured to encrypt signals using a cryptographic key to generate encrypted wireless signals. The wireless communicator WC1 is configured to transmit wireless signals via the antenna. The wireless communicator WC1 can be a one-way wireless communication device such as a receiver, or a two-way wireless communication device such as a transceiver.

The wireless communicator WC1 is configured to receive wireless signals via the antenna. In the present embodiment, the wireless communicator WC1 is configured to decode the wireless signals to recognize signals transmitted from other wireless communicators. The wireless communicator WC1 is configured to decrypt the wireless signals using the cryptographic key.

As seen in FIG. 2, the electrical device 12 further comprises a force sensor 32. For example, the force sensor 32 is configured to obtain at least one of: the power applied to the rotational device 10; the deformation amount of the rotational device 10; the force applied to the rotational device 10; and the torque applied to the rotational device 10. In the present embodiment, the force sensor 32 is configured to obtain the deformation amount of the rotational device 10. The force sensor 32 is configured to obtain the deformation amount of the crank arm 14. The electronic controller EC1 is configured to receive the deformation amount obtained by the force sensor 32. The electronic controller EC1 is configured to calculate the torque applied to the rotational device 10 based on the deformation amount sensed by the force sensor 32. The electronic controller EC1 is configured to calculate the power INF11 based on the torque and the rotational speed INF12.

For example, the force sensor 32 includes a strain gauge 34 and a measurement circuit 36. The strain gauge 34 is attached to the crank arm 14. The strain gauge 34 is configured to output a change in electrical resistance depending on the deformation amount of the rotational device 10. The strain gauge 34 is configured to output the change in the electrical resistance depending on the deformation amount of the crank arm 14. The measurement circuit 36 is electrically connected to the strain gauge 34 to convert the output of the strain gauge 34 to a voltage indicating the deformation amount of the rotational device 10. The measurement circuit 36 is electrically connected to the strain gauge 34 to convert the output of the strain gauge 34 to a voltage indicating the deformation amount of the crank arm 14. For example, the measurement circuit 36 include a bridge circuit with the strain gauge 34.

The measurement circuit 36 is electrically connected to the electronic controller EC1. The measurement circuit 36 is electrically mounted on the circuit board 30C of the electronic controller EC1. For example, the measurement circuit 36 is electrically connected to strain gauge 34 via the circuit board 30C and an additional circuit board such as a flexible printed circuit. The electronic controller EC1 is electrically connected to the measurement circuit 36 to receive the rotational information INF1 from the measurement circuit 36. The electronic controller EC1 is electrically connected to the measurement circuit 36 to receive the deformation amount of the rotational device 10 from the measurement circuit 36. The electronic controller EC1 is electrically connected to the measurement circuit 36 to receive the deformation amount of the crank arm 14 from the measurement circuit 36.

As seen in FIG. 2, the electrical device 12 further comprises a position sensor 38. The position sensor 38 is configured to sense a rotational position of the rotational device 10. The position sensor 38 is configured to sense the rotational position of the rotational device 10 about the rotational axis A1. In the present embodiment, the position sensor 38 includes an accelerometer 38A. The accelerometer 38A is configured to sense acceleration applied to the electrical device 12. The position sensor 38 can include another sensor other than the accelerometer 38A if needed or desired.

Figure 3:
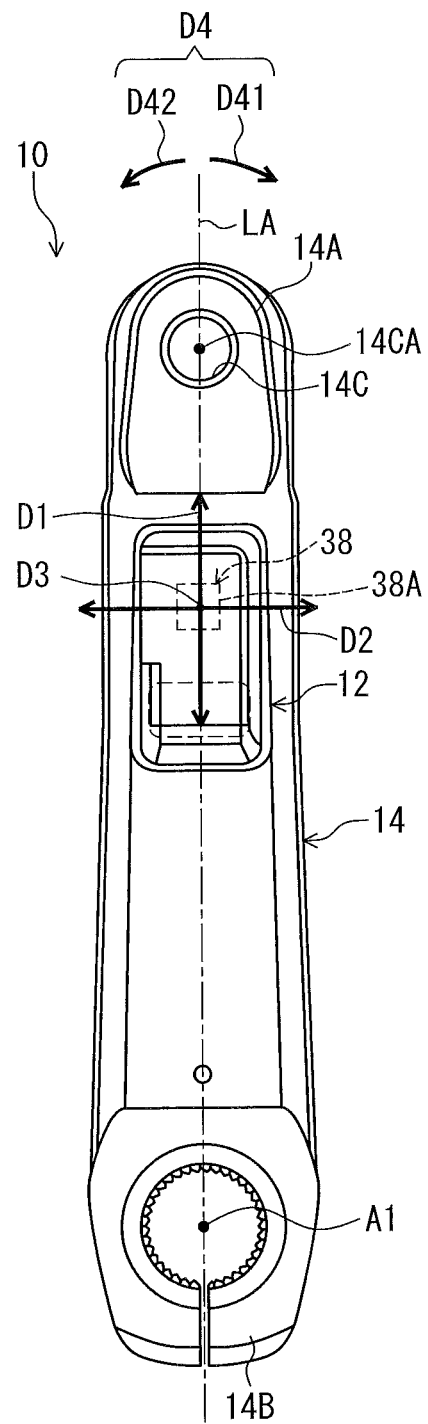
FIG. 3 is a side-elevational view of the rotational device illustrated in FIG. 1.

As seen in FIG. 3, the crank arm 14 has a longitudinal axis LA and extends along the longitudinal axis LA. The longitudinal axis LA is defined to intersect with the rotational axis A1 and a center axis 14CA of the pedal securing hole 14C as viewed along the rotational axis A1. The rotational position PS of the rotational device 10 is defined based on the longitudinal axis LA. The radial direction D1 is parallel to the longitudinal axis LA.

A radial direction D1 is defined with respect to the rotational device 10. A rotational direction D2 is defined with respect to the rotational device 10. An axial direction D3 is defined with respect to the rotational device 10. The radial direction D1 is radially defined with respect to the rotational axis A1. The radial direction D1 is defined to be parallel to the longitudinal axis LA. The axial direction D3 is defined to be parallel to the rotational axis A1. The rotational direction D2 is defined to be perpendicular to the radial direction D1 and the axial direction D3.

Figure 4:
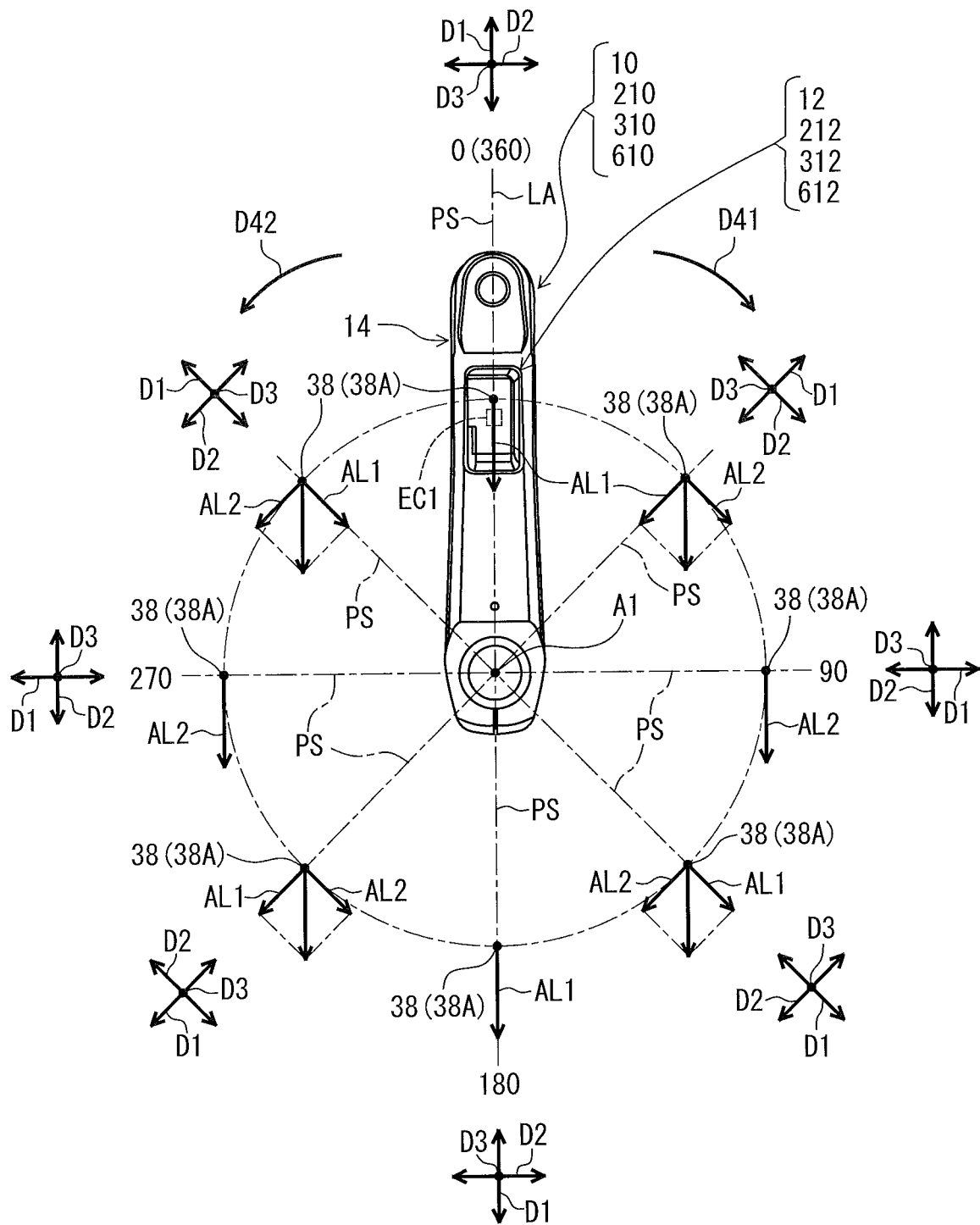
FIG. 4 is a side-elevational view of a part of the rotational device illustrated in FIG. 1 for showing directions defined with respect to the rotational device, acceleration applied to the rotational device.

As seen in FIG. 4, the accelerometer 38A is configured to sense radial acceleration AL1 defined in the radial direction D1 with respect to the rotational axis A1 of the rotational device 10. The accelerometer 38A is configured to sense rotational acceleration AL2 defined in the rotational direction D2 with respect to the rotational axis A1. The accelerometer 38A is configured to sense axial acceleration AL3 defined in the axial direction D3 parallel to the rotational axis A1 of the rotational device 10.

The electronic controller EC1 is configured to receive the radial acceleration AL1, the rotational acceleration AL2, and the axial acceleration AL3 from the position sensor 38. The electronic controller EC1 is configured to obtain the rotational position of the rotational device 10 based on the radial acceleration AL1 and the rotational acceleration AL2.

In the present embodiment, the accelerometer 38A include a triaxial accelerometer. However, the accelerometer 38A can include a dual-axis accelerometer if needed or desired. The position sensor 38 can include other sensors such as a gyro meter or a magnetic sensor instead of or in addition to the accelerometer 38A if needed or desired. The magnetic sensor can include a magnetic body and a hall sensor.

The electronic controller EC1 is electrically connected to the position sensor 38 to obtain the rotational position sensed by the position sensor 38. The electronic controller EC1 is configured to obtain the rotational position PS based on the radial acceleration AL1 and the rotational acceleration AL2 which are sensed by the accelerometer 38A. The electronic controller EC1 is configured to obtain the rotational position PS of the rotational device 10 at predetermined intervals based on the radial acceleration AL1 and the rotational acceleration AL2.

The rotational position PS of the rotational device 10 is defined from 0 degrees to 360 degrees. The radial acceleration AL1 includes a radial component of gravity which is applied to the position sensor 38 in the radial direction D1. The rotational acceleration AL2 includes a rotational component of gravity which is applied to the position sensor 38 in the rotational direction D2. The rotational position PS indicates an absolute position of the rotational device 10 which is defined about the rotational axis A1.

Figure 5:
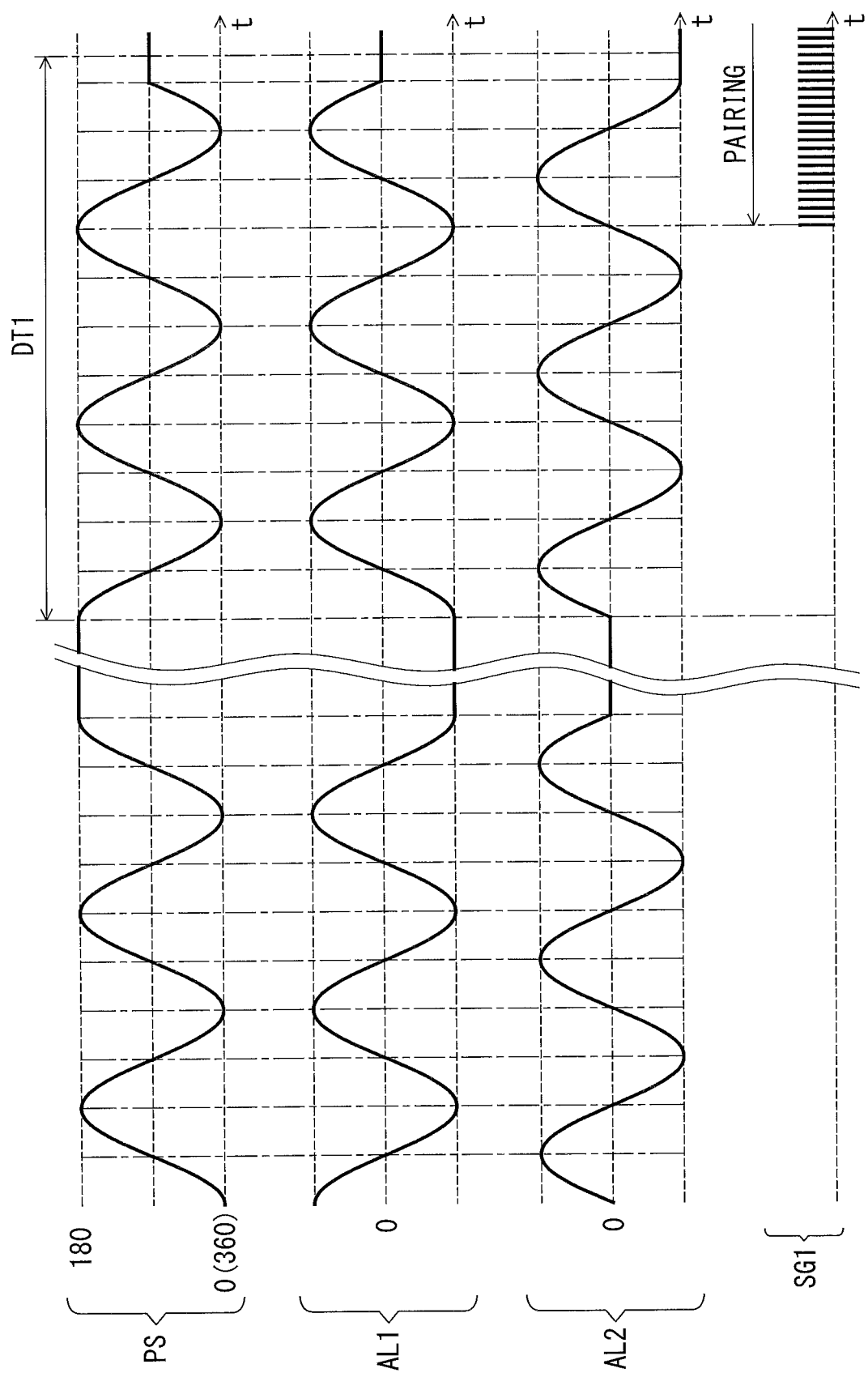
FIG. 5 is a timing chart showing a rotational position of the rotational device illustrated in FIG. 1.

As seen in FIG. 5, the radial acceleration AL1 defines a waveform depicted in FIG. 5 in response to the constant-speed rotation of the rotational device 10. The rotational acceleration AL2 defines a waveform depicted in FIG. 5 in response to the constant-speed rotation of the rotational device 10. The waveform defined by the radial acceleration AL1 is offset from the waveform defined by the rotational acceleration AL2 by 90 degrees.

The electronic controller EC1 is configured to obtain the rotational position PS of the rotational device 10 based on a relationship between the radial acceleration AL1 and the rotational acceleration AL2. For example, the electronic controller EC1 is configured to store relationship information indicating a relationship between the rotational position, the radial acceleration AL1, and the rotational acceleration AL2. Examples of the relationship information include a table and a relational expression. The electronic controller EC1 is configured to obtain the rotational position of the rotational device 10 based on the relationship information, the radial acceleration AL1, and the rotational acceleration AL2.

The electronic controller EC1 is configured to obtain an amount of rotation of the rotational device 10 based on the radial acceleration AL1 and the rotational acceleration AL2. For example, the amount of rotation includes at least one of: a rotation angle of the rotational device 10; and a total number of rotations of the rotational device 10. In the present embodiment, the electronic controller EC1 is configured to obtain the rotation angle of the rotational device 10 based on the radial acceleration AL1 and the rotational acceleration AL2. The electronic controller EC1 is configured to obtain the total number of rotations of the rotational device 10 based on the radial acceleration AL1 and the rotational acceleration AL2. The electronic controller EC1 is configured to obtain the rotational speed INF12 of the rotational device 10 based on the radial acceleration AL1 and the rotational acceleration AL2.

The electronic controller EC1 is configured to obtain an amount of reverse rotation of the rotational device 10 based on the radial acceleration AL1 and the rotational acceleration AL2. For example, the amount of reverse rotation includes at least one of: a rotation angle of the reverser rotation of the rotational device 10; and a total number of reverse rotations of the rotational device 10. One reverse rotation includes reverse rotation of 360 degrees in the reverse direction D42. In the present embodiment, the electronic controller EC1 is configured to obtain the rotation angle of the reverser rotation of the rotational device 10 based on the radial acceleration AL1 and the rotational acceleration AL2. The electronic controller EC1 is configured to obtain the total number of reverse rotations of the rotational device 10 based on the radial acceleration AL1 and the rotational acceleration AL2.

As seen in FIG. 2, the electrical device 12 includes an electric power source 42 and a power-source holder 44. The electric power source 42 is electrically connected to the wireless communicator WC1, the electronic controller EC1, the force sensor 32, and the position sensor 38 to supply electricity to the wireless communicator WC1, the electronic controller EC1, the force sensor 32, and the position sensor 38. The power-source holder 44 is electrically connected to the wireless communicator WC1, the electronic controller EC1, the force sensor 32, and the position sensor 38 to supply electricity from the electric power source 42 to the wireless communicator WC1, the electronic controller EC1, the force sensor 32, and the position sensor 38. The power-source holder 44 is configured to detachably hold the electric power source 42. Examples of the electric power source 42 include a battery. Examples of the battery include a primary battery and a secondary battery.

The electrical device 12 includes an electric connector port 45 to which a cable connector of an electric cable is detachably connectable. The electric connector port 45 is electrically connected to the electronic controller EC1. In a case where the electric power source 42 includes a secondary battery, the electric power source 42 can be charged via the electric connector port 45. In such embodiments, the electrical device 12 includes a voltage controller configured to control electricity supplied from an electric power supply via the electric connector port 45. The electronic controller EC1 can be configured to communicate with another electrical device via the electric connector port 45 and an electric cable for maintenance such as updating software if needed or desired.

The electrical device 12 is configured to communicate with the additional electrical device 6. The additional electrical device 6 is configured to wirelessly receive the rotational information INF1 from the electrical device 12. The additional electrical device 6 is configured to wirelessly receive the power INF11 and the rotational speed INF12 from the electrical device 12. Examples of the additional electrical device 6 include a cyclocomputer, a smartphone, and a tablet computer.

The additional electrical device 6 includes the additional wireless communicator WC2, an additional electronic controller EC2, a display 46, and a user interface 48. The additional electronic controller EC2 is electrically connected to the additional wireless communicator WC2, the display 46, and the user interface 48 to control the additional wireless communicator WC2, the display 46, and the user interface 48.

The additional wireless communicator WC2 is configured to wirelessly receive the rotational information INF1 from the wireless communicator WC1. The additional wireless communicator WC2 is configured to wirelessly receive the power INF11 and the rotational speed INF12 from the wireless communicator WC1. The additional electronic controller EC2 is electrically connected to the additional wireless communicator WC2 to receive the rotational information INF1 wirelessly received by the additional wireless communicator WC2. The additional electronic controller EC2 is electrically connected to the additional wireless communicator WC2 to receive the power INF11 and the rotational speed INF12 wirelessly received by the additional wireless communicator WC2.

As seen in FIG. 2, the additional electronic controller EC2 includes a hardware processor 50P, a hardware memory 50M, a circuit board 50C, and a bus 50D. The hardware processor 50P is coupled to the hardware memory 50M. The hardware memory 50M is coupled to the hardware processor 50P. The hardware processor 50P and the hardware memory 50M are electrically mounted on the circuit board 50C. The hardware processor 50P is electrically connected to the hardware memory 50M via the circuit board 50C and the bus 50D. The hardware memory 50M is electrically connected to the hardware processor 50P via the circuit board 50C and the bus 50D. The bus 50D is provided on the circuit board 50C. For example, the electronic controller EC2 includes a semiconductor. The hardware processor 50P includes a semiconductor. The hardware memory 50M includes a semiconductor. However, the additional electronic controller EC2 can be free of a semiconductor if needed or desired. The hardware processor 50P can be free of a semiconductor if needed or desired. The hardware memory 50M can be free of a semiconductor if needed or desired.

For example, the hardware processor 50P includes at least one of a CPU, a MPU, and a memory controller. The hardware memory 50M is electrically connected to the hardware processor 50P. For example, the hardware memory 50M includes at least one of a volatile memory and a non-volatile memory. Examples of the volatile memory include a RAM and a DRAM. Examples of the non-volatile memory include a ROM, an EEPROM, and an HDD. The hardware memory 50M includes storage areas each having an address. The hardware processor 50P is configured to control the hardware memory 50M to store data in the storage areas of the hardware memory 50M and reads data from the storage areas of the hardware memory 50M. The hardware memory 50M can also be referred to as a computer-readable storage medium 50M.

The additional electronic controller EC2 is programmed to execute at least one control algorithm of the additional electrical device 6. The hardware memory 50M stores at least one program including at least one program instruction. The at least one program is read into the hardware processor 50P, and thereby the at least one control algorithm of the additional electrical device 6 is executed based on the at least one program. The additional electronic controller EC2 can also be referred to as an electronic controller circuit or circuitry EC2. The additional electronic controller EC2 can also be referred to as an additional hardware electronic controller EC2.

The structure of the additional electronic controller EC2 is not limited to the above structure. The structure of the additional electronic controller EC2 is not limited to the hardware processor 50P, the hardware memory 50M, and the bus 50D. The additional electronic controller EC2 can be realized by hardware alone or a combination of hardware and software. The hardware processor 50P and the hardware memory 50M can be integrated as a one chip such as an ASIC or a FPGA. The hardware processor 50P and the hardware memory 50M can be separate chips. The additional electronic controller EC2 can be at least two electronic controllers which are separately provided.

The at least one control algorithm of the additional electrical device 6 can be executed by the at least two electronic controllers if needed or desired. The additional electronic controller EC2 can include at least two hardware processors which are separately provided. The additional electronic controller EC2 can include at least two hardware memories which are separately provided. The at least one control algorithm of the additional electrical device 6 can be executed by the at least two hardware processors if needed or desired. The at least one control algorithm of the additional electrical device 6 can be stored in the at least two hardware memories if needed or desired. The additional electronic controller EC2 can include at least two circuit boards which are separately provided if needed or desired. The additional electronic controller EC2 can include at least two buses which are separately provided if needed or desired.

As seen in FIG. 2, the additional wireless communicator WC2 is electrically connected to the hardware processor 50P and the hardware memory 50M with the circuit board 50C and the bus 50D. The additional wireless communicator WC2 is electrically mounted on the circuit board. The additional wireless communicator WC2 includes a signal transmitting circuit or circuitry, a signal receiving circuit or circuitry, and an antenna. Thus, the additional wireless communicator WC2 can also be referred to as an additional wireless communicator circuit or circuitry WC2.

The additional wireless communicator WC2 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the additional wireless communicator WC2 is configured to encrypt signals using a cryptographic key to generate encrypted wireless signals. The additional wireless communicator WC2 is configured to transmit wireless signals via the antenna. The wireless communicator WC2 can be a one-way wireless communication device such as a receiver, or a two-way wireless communication device such as a transceiver.

The additional wireless communicator WC2 is configured to receive wireless signals via the antenna. In the present embodiment, the additional wireless communicator WC2 is configured to decode the wireless signals to recognize signals transmitted from other additional wireless communicators. The additional wireless communicator WC2 is configured to decrypt the wireless signals using the cryptographic key.

The display 46 is configured to display the rotational information INF1 wirelessly transmitted from the wireless communicator WC1 of the electrical device 12. The display 46 is configured to display the power INF11 and the rotational speed INF12 wirelessly transmitted from the wireless communicator WC1 of the electrical device 12. The additional electronic controller EC2 is configured to control the display 46 to display the rotational information INF1. The additional electronic controller EC2 is configured to control the display 46 to display the power INF11 and the rotational speed INF12.

The user interface 48 is configured to receive a user input. Examples of the user interface 48 include a mouse, a keyboard, and a touch panel. The additional electronic controller EC2 is configured to receive the user input via the user interface 48.

The additional electrical device 6 includes an electric power source 52 and a power-source holder 54. The electric power source 52 is electrically connected to the additional wireless communicator WC2, the additional electronic controller EC2, the display 46, and the user interface 48 to supply electricity to the additional wireless communicator WC2, the additional electronic controller EC2, the display 46, and the user interface 48. The power-source holder 54 is electrically connected to the additional wireless communicator WC2, the additional electronic controller EC2, the display 46, and the user interface 48 to supply electricity from the electric power source 52 to the additional wireless communicator WC2, the additional electronic controller EC2, the display 46, and the user interface 48. The power-source holder 54 is configured to detachably hold the electric power source 52. Examples of the electric power source 52 include a battery. Examples of the battery include a primary battery and a secondary battery.

As seen in FIG. 2, the electrical device 12 is configured to communicate with an external electrical device 8. The external electrical device 8 is configured to receive input information INF2 from the user. The electronic controller EC1 is configured to receive the input information INF2 from the external electrical device 8. Examples of the external electrical device 8 include a cyclocomputer, a smartphone, a tablet computer, and a personal computer. For example, the input information INF2 includes an input rotational position INF21 of the rotational device 10, an input rotational range INF22 of the rotational device 10, identification information INF23 of the rotational device 10, and identification information INF24 of the human-powered vehicle 2. The identification information INF23 of the rotational device 10 includes at least one of a manufacture name, a model name, and a model number of the rotational device 10. The identification information INF24 of the human-powered vehicle 2 includes at least one of a manufacture name, a model name, and a model number of the human-powered vehicle 2.

The external electrical device 8 includes an external wireless communicator WC3, an external electronic controller EC3, a display 56, and a user interface 58. The external electronic controller EC3 is electrically connected to the external wireless communicator WC3, the display 56, and the user interface 58 to control the external wireless communicator WC3, the display 56, and the user interface 58.

As seen in FIG. 2, the external electronic controller EC3 includes a hardware processor 60P, a hardware memory 60M, and a circuit board 60C, and a bus 60D. The hardware processor 60P is coupled to the hardware memory 60M. The hardware memory 60M is coupled to the hardware processor 60P. The hardware processor 60P and the hardware memory 60M are electrically mounted on the circuit board 60C. The hardware processor 60P is electrically connected to the hardware memory 60M via the circuit board 60C and the bus 60D. The hardware memory 60M is electrically connected to the hardware processor 60P via the circuit board 60C and the bus 60D. The bus 60D is provided on the circuit board 60C. For example, the electronic controller EC3 includes a semiconductor. The hardware processor 60P includes a semiconductor. The hardware memory 60M includes a semiconductor. However, the external electronic controller EC3 can be free of a semiconductor if needed or desired. The hardware processor 60P can be free of a semiconductor if needed or desired. The hardware memory 60M can be free of a semiconductor if needed or desired.

For example, the hardware processor 60P includes at least one of a CPU, a MPU, and a memory controller. The hardware memory 60M is electrically connected to the hardware processor 60P. For example, the hardware memory 60M includes at least one of a volatile memory and a non-volatile memory. Examples of the volatile memory include a RAM and a DRAM. Examples of the non-volatile memory include a ROM, an EEPROM, and an HDD. The hardware memory 60M includes storage areas each having an address. The hardware processor 60P is configured to control the hardware memory 60M to store data in the storage areas of the hardware memory 60M and reads data from the storage areas of the hardware memory 60M. The hardware memory 60M can also be referred to as a computer-readable storage medium 60M.

The external electronic controller EC3 is programmed to execute at least one control algorithm of the additional electrical device 6. The hardware memory 60M stores at least one program including at least one program instruction. The at least one program is read into the hardware processor 60P, and thereby the at least one control algorithm of the additional electrical device 6 is executed based on the at least one program. The external electronic controller EC3 can also be referred to as an electronic controller circuit or circuitry EC3. The external electronic controller EC3 can also be referred to as an external hardware electronic controller EC3.

The structure of the external electronic controller EC3 is not limited to the above structure. The structure of the external electronic controller EC3 is not limited to the hardware processor 60P, the hardware memory 60M, and the bus 60D. The external electronic controller EC3 can be realized by hardware alone or a combination of hardware and software. The hardware processor 60P and the hardware memory 60M can be integrated as a one chip such as an ASIC or a FPGA. The hardware processor 60P and the hardware memory 60M can be separate chips. The external electronic controller EC3 can be at least two electronic controllers which are separately provided.

The at least one control algorithm of the external electrical device 8 can be executed by the at least two electronic controllers if needed or desired. The external electronic controller EC3 can include at least two hardware processors which are separately provided. The external electronic controller EC3 can include at least two hardware memories which are separately provided. The at least one control algorithm of the external electrical device 8 can be executed by the at least two hardware processors if needed or desired. The at least one control algorithm of the external electrical device 8 can be stored in the at least two hardware memories if needed or desired. The external electronic controller EC3 can include at least two circuit boards which are separately provided if needed or desired. The external electronic controller EC3 can include at least two buses which are separately provided if needed or desired.

The external wireless communicator WC3 is configured to wirelessly communicate with another wireless communicator such as the wireless communicator WC1 and the additional wireless communicator WC2. However, the external electrical device 8 can include an external wired communicator if needed or desired. The external wired communicator is configured to communicate with the electrical device 12 via an electric cable using power line communication (PLC) technology.

As seen in FIG. 2, the external wireless communicator WC3 is electrically connected to the hardware processor 60P and the hardware memory 60M with the circuit board 60C and the bus 60D. The external wireless communicator WC3 is electrically mounted on the circuit board. The external wireless communicator WC3 includes a signal transmitting circuit or circuitry, a signal receiving circuit or circuitry, and an antenna. Thus, the external wireless communicator WC3 can also be referred to as an external wireless communicator circuit or circuitry WC3.

The external wireless communicator WC3 is configured to superimpose digital signals on carrier wave using a predetermined wireless communication protocol to wirelessly transmit signals. Examples of the predetermined wireless communication protocol include Wi-Fi (registered trademark), Zigbee (registered trademark), Bluetooth (registered trademark), ANT (registered trademark), and other wireless communication protocols. In the present embodiment, the external wireless communicator WC3 is configured to encrypt signals using a cryptographic key to generate encrypted wireless signals. The external wireless communicator WC3 is configured to transmit wireless signals via the antenna. The wireless communicator WC3 can be a one-way wireless communication device such as a receiver, or a two-way wireless communication device such as a transceiver.

The external wireless communicator WC3 is configured to receive wireless signals via the antenna. In the present embodiment, the external wireless communicator WC3 is configured to decode the wireless signals to recognize signals transmitted from other external wireless communicators. The external wireless communicator WC3 is configured to decrypt the wireless signals using the cryptographic key.

The display 56 is configured to display information relating to the human-powered vehicle 2. The external electronic controller EC3 is configured to control the display 56 to display the information relating to the human-powered vehicle 2. For example, the information relating to the human-powered vehicle 2 includes the rotational information INF1 and the settings of the rotational device 10.

The user interface 58 is configured to receive a user input. Examples of the user interface 58 include a mouse, a keyboard, and a touch panel. The external electronic controller EC3 is configured to receive the user input via the user interface 58. The external electronic controller EC3 is configured to receive the input information INF2 via the user interface 58.

The external electrical device 8 includes an electric power source 62 and a power-source holder 64. The electric power source 62 is electrically connected to the external wireless communicator WC3, the external electronic controller EC3, the display 56, and the user interface 58 to supply electricity to the external wireless communicator WC3, the external electronic controller EC3, the display 56, and the user interface 58. The power-source holder 64 is electrically connected to the external wireless communicator WC3, the external electronic controller EC3, the display 56, and the user interface 58 to supply electricity from the electric power source 62 to the external wireless communicator WC3, the external electronic controller EC3, the display 56, and the user interface 58. The power-source holder 64 is configured to detachably hold the electric power source 62. Examples of the electric power source 62 include a battery (e.g., a primary battery, a secondary battery).

The electronic controller EC1 is configured to control the wireless communicator WC1 to wirelessly transmit the rotational information INF1 at predetermined intervals. The electronic controller EC1 is configured to control the wireless communicator WC1 to wirelessly transmit the power INF11 and the rotational speed INF12 at the predetermined intervals.

The additional wireless communicator WC2 of the additional electrical device 6 is configured to wirelessly receive the rotational information INF1 transmitted from the wireless communicator WC1 of the electrical device 12 at the predetermined intervals. The additional wireless communicator WC2 of the additional electrical device 6 is configured to wirelessly receive the power INF11 and the rotational speed INF12 transmitted from the wireless communicator WC1 of the electrical device 12 at the predetermined intervals.

The additional electronic controller EC2 of the additional electrical device 6 is configured to control the display 46 to display the rotational information INF1 wirelessly received by the additional wireless communicator WC2 at the predetermined intervals. The additional electronic controller EC2 is configured to control the display 46 to display at least one of the power INF11 and the rotational speed INF12 wirelessly received by the additional wireless communicator WC2 at the predetermined intervals. The additional electronic controller EC2 is configured to control the display 46 to display the latest values of the power INF11 and the rotational speed INF12. Thus, the user can recognize the power INF11 and the rotational speed INF12 of the rotational device 10 via the display 46 of the additional electrical device 6 during pedaling.

Figure 6:
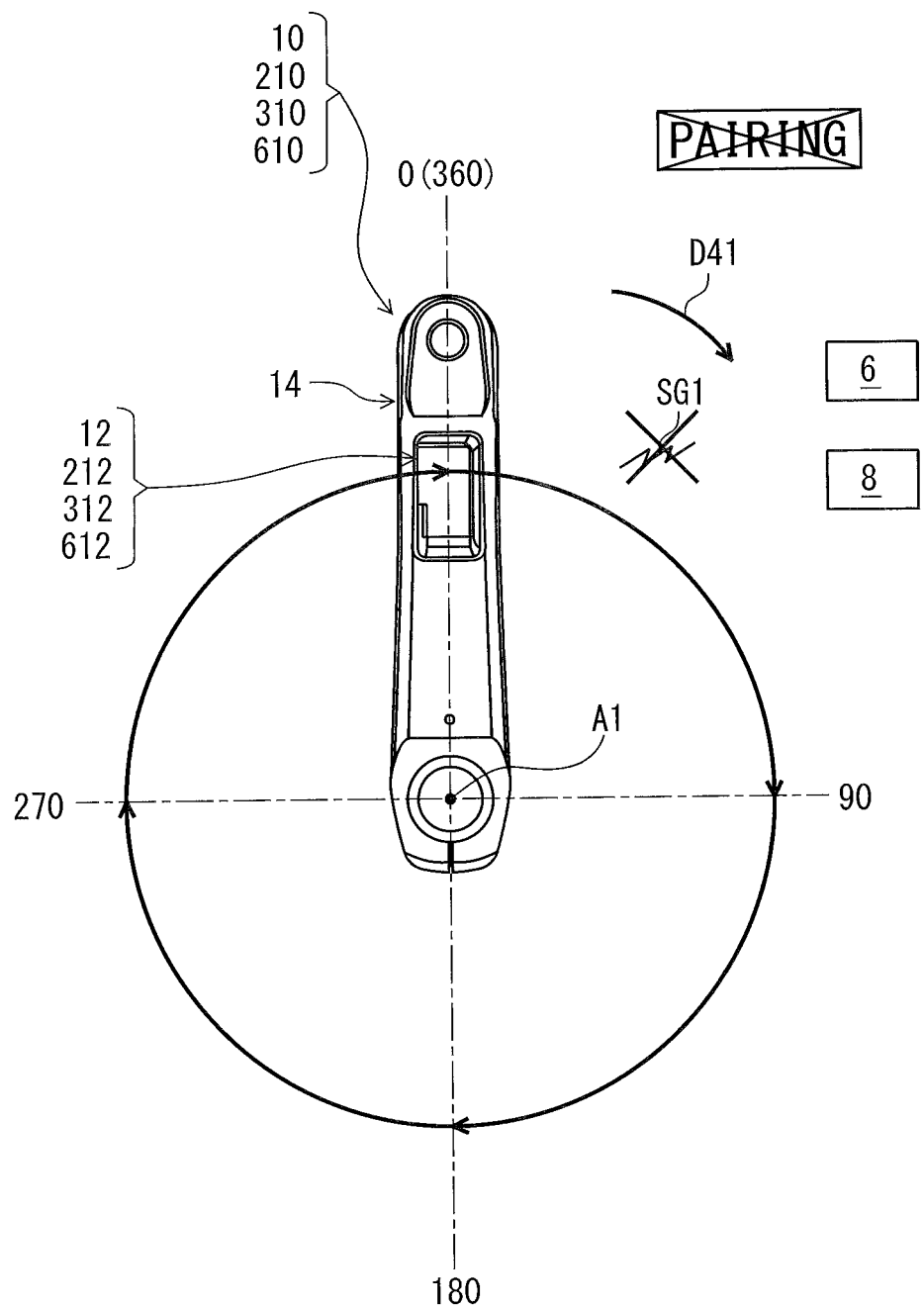
FIG. 6 is a side-elevational view of the rotational device illustrated in FIG. 1 for showing normal rotation.
Figure 7:
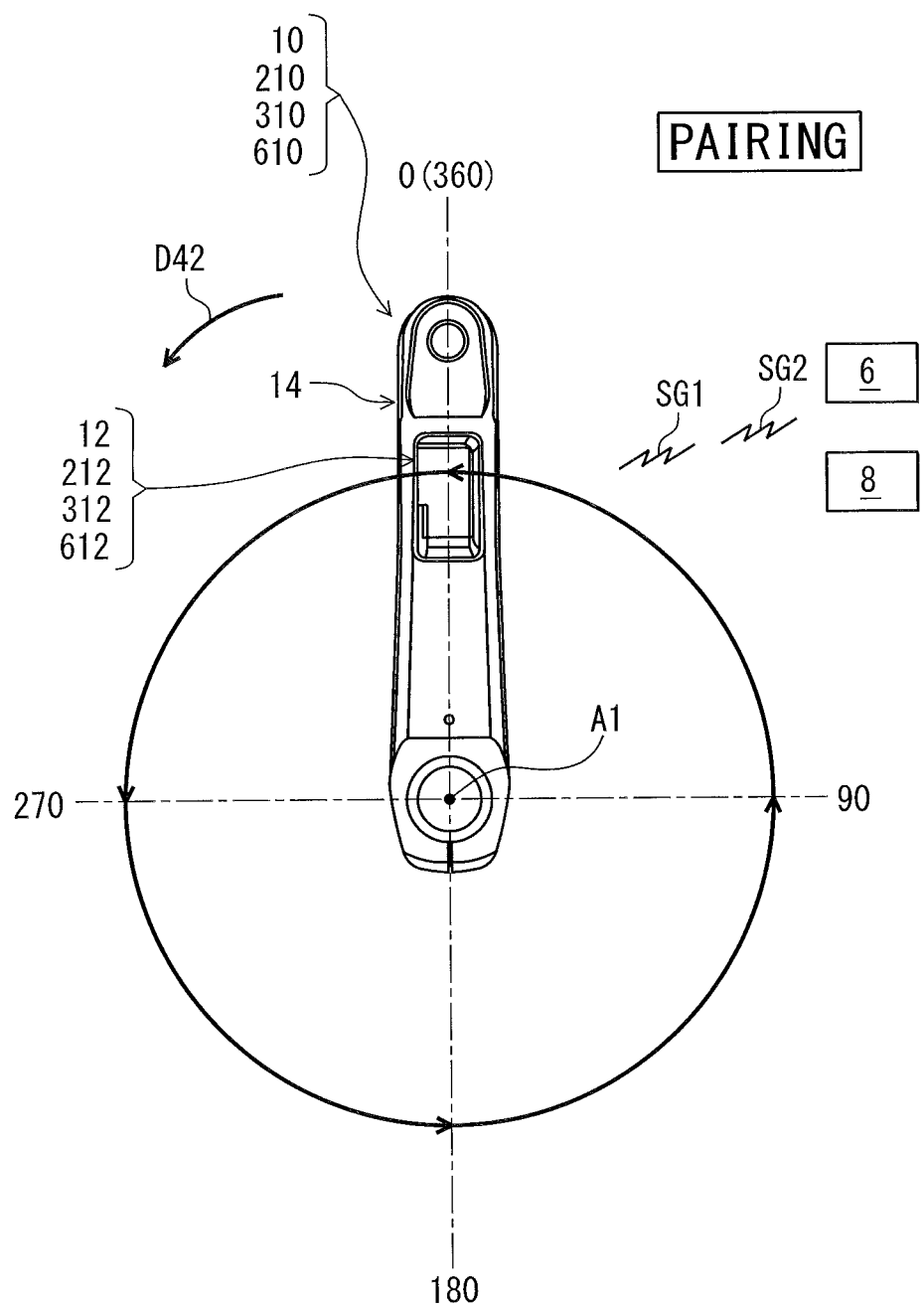
FIG. 7 is a side-elevational view of the rotational device illustrated in FIG. 1 for showing reverse rotation.

To establish wireless communication between the electrical device 12 and another device, the electrical device 12 is configured to execute pairing with another device such as the additional electrical device 6 and the external electrical device 8. As seen in FIG. 6, the electrical device 12 is configured not to execute pairing with another device in response to reverse rotation of the rotational device 10. As seen in FIG. 7, however, the electrical device 12 is configured to execute pairing with another device in response to reverse rotation of the rotational device 10. Namely, the reverse rotation of the rotational device 10 triggers pairing.

As seen in FIG. 4, the electronic controller EC1 is configured to determine whether the rotational device 10 rotates in the driving rotational direction D41 based on the rotational position PS sensed by the position sensor 38. The electronic controller EC1 is configured to determine whether the rotational device 10 rotates in the reverse direction D42 based on the rotational position PS sensed by the position sensor 38.

The electronic controller EC1 is configured to determine whether the rotational device 10 rotates in the driving rotational direction D41 based on the radial acceleration AL1 and the rotational acceleration AL2 which are sensed by the position sensor 38. The electronic controller EC1 is configured to determine whether the rotational device 10 rotates in the reverse direction D42 based on the radial acceleration AL1 and the rotational acceleration AL2.

The electronic controller EC1 is configured to determine whether the rotational device 10 rotates in the driving rotational direction D41 based on the rotational position PS obtained based on the radial acceleration AL1 and the rotational acceleration AL2 which are sensed by the position sensor 38. The electronic controller EC1 is configured to determine whether the rotational device 10 rotates in the reverse direction D42 based on the rotational position PS obtained based on the radial acceleration AL1 and the rotational acceleration AL2 which are sensed by the position sensor 38.

The electronic controller EC1 is configured to determine whether the rotational device 10 rotates in the driving rotational direction D41 based on the rotational position PS obtained based on the radial acceleration AL1 and the rotational acceleration AL2. The electronic controller EC1 is configured to determine whether the rotational device 10 rotates in the reverse direction D42 based on the rotational position PS obtained based on the radial acceleration AL1 and the rotational acceleration AL2. For example, the electronic controller EC1 is configured to conclude that the rotational device 10 rotates in the driving rotational direction D41 in a case where a change in the rotational position PS increases. The electronic controller EC1 is configured to conclude that the rotational device 10 rotates in the reverse direction D42 in a case where a change in the rotational position PS decreases.

The electronic controller EC1 is configured to obtain the amount of normal rotation of the rotational device 10 based on the radial acceleration AL1 and the rotational acceleration AL2. The electronic controller EC1 is configured to start to obtain the amount of normal rotation of the rotational device 10 based on the radial acceleration AL1 and the rotational acceleration AL2 in a case where the electronic controller EC1 recognizes the normal rotation of the rotational device 10. The normal rotation occurs when the rotational device 10 rotates in the driving rotational direction D41. The amount of normal rotation include a total number of rotations of the rotational device 10 in the driving rotational direction D41. Thus, the electronic controller EC1 is configured to obtain the rotational speed INF12.

The electronic controller EC1 is configured to obtain the amount of reverse rotation AR based on the radial acceleration AL1 and the rotational acceleration AL2. The electronic controller EC1 is configured to start to obtain the amount of reverse rotation AR of the rotational device 10 based on the radial acceleration AL1 and the rotational acceleration AL2 in a case where the electronic controller EC1 recognizes the reverse rotation of the rotational device 10. The reverse rotation occurs when the rotational device 10 rotates in the reverse direction D42.

As seen in FIG. 6, the electronic controller EC1 is configured to control the wireless communicator WC1 not to execute pairing in response to the normal rotation of the rotational device 10. As seen in FIG. 7, the electronic controller EC1 is configured to control the wireless communicator WC1 to execute pairing in response to the reverse rotation of the rotational device 10. The electronic controller EC1 is configured to control the wireless communicator WC1 to wirelessly transmit a pairing signal SG1 in response to the reverse rotation of the rotational device 10.

The electronic controller EC1 is configured to control the wireless communicator WC1 to execute pairing in a case where the amount of reverse rotation AR of the rotational device 10 is greater than or equal to a rotation threshold TR. The electronic controller EC1 is configured to control the wireless communicator WC1 to wirelessly transmit the pairing signal SG1 in the case where the amount of reverse rotation AR of the rotational device 10 is greater than or equal to the rotation threshold TR.

The electronic controller EC1 is configured to control the wireless communicator WC1 to execute pairing in a case where the amount of reverse rotation AR of the rotational device 10 is greater than or equal to the rotation threshold TR before a determination time DT1 elapses. The electronic controller EC1 is configured to control the wireless communicator WC1 to wirelessly transmit the pairing signal SG1 in the case where the rotational angle of the reverse rotation is greater than or equal to the rotation threshold TR before the determination time DT1 elapses.

The electronic controller EC1 stores the rotation threshold TR in the hardware memory 30M. The electronic controller EC1 stores the determination time DT1 in the hardware memory 30M. The rotation threshold TR ranges from 540 degrees to 1080 degrees. The determination time DT1 ranges from 3 seconds to 10 seconds. In the present embodiment, for example, the rotation threshold TR is 720 degrees, and the determination time DT1 is 5 seconds. However, the rotation threshold TR is not limited to the above value. The determination time DT1 is not limited to the above value. The rotation threshold TR can be the number of reverse rotation. The rotation threshold TR can be changed by the user using a device such as the additional electrical device 6 or the external electrical device 8. The determination time DT1 can be changed by the user using a device such as the additional electrical device 6 or the external electrical device 8.

For example, the electronic controller EC1 is configured to control the wireless communicator WC1 to execute advertising in response to the reverse rotation of the rotational device 10. The pairing signal SG1 includes an advertisement signal. The electronic controller EC1 is configured to control the wireless communicator WC1 to wirelessly transmit the advertisement signal at advertising intervals in response to the reverse rotation of the rotational device 10. The electronic controller EC1 is configured to execute advertising in a case where the amount of reverse rotation AR of the rotational device 10 is greater than or equal to the rotation threshold TR before the determination time DT1 elapses. The electronic controller EC1 starts to measure a time in response to the reverse rotation of the rotational device 10. The determination time DT1 elapses when the measured time reaches a time length of the determination time DT1.

The additional electrical device 6 is configured to detect the pairing signal SG1 via the additional wireless communicator WC2. The additional electrical device 6 is configured to wirelessly transmit a connection signal SG2 via the additional wireless communicator WC2 in response to the pairing signal SG1. The electrical device 12 is configured to wirelessly receive the connection signal SG2 via the wireless communicator WC1. Thus, the wireless communication is established between the electrical device and the additional electrical device 6. The wireless communication can be established between the electrical device and the external electrical device 8 in the same way.

The pairing process executed between the electrical device 12 and another device will be described below referring to FIG. 8.

Figure 8:
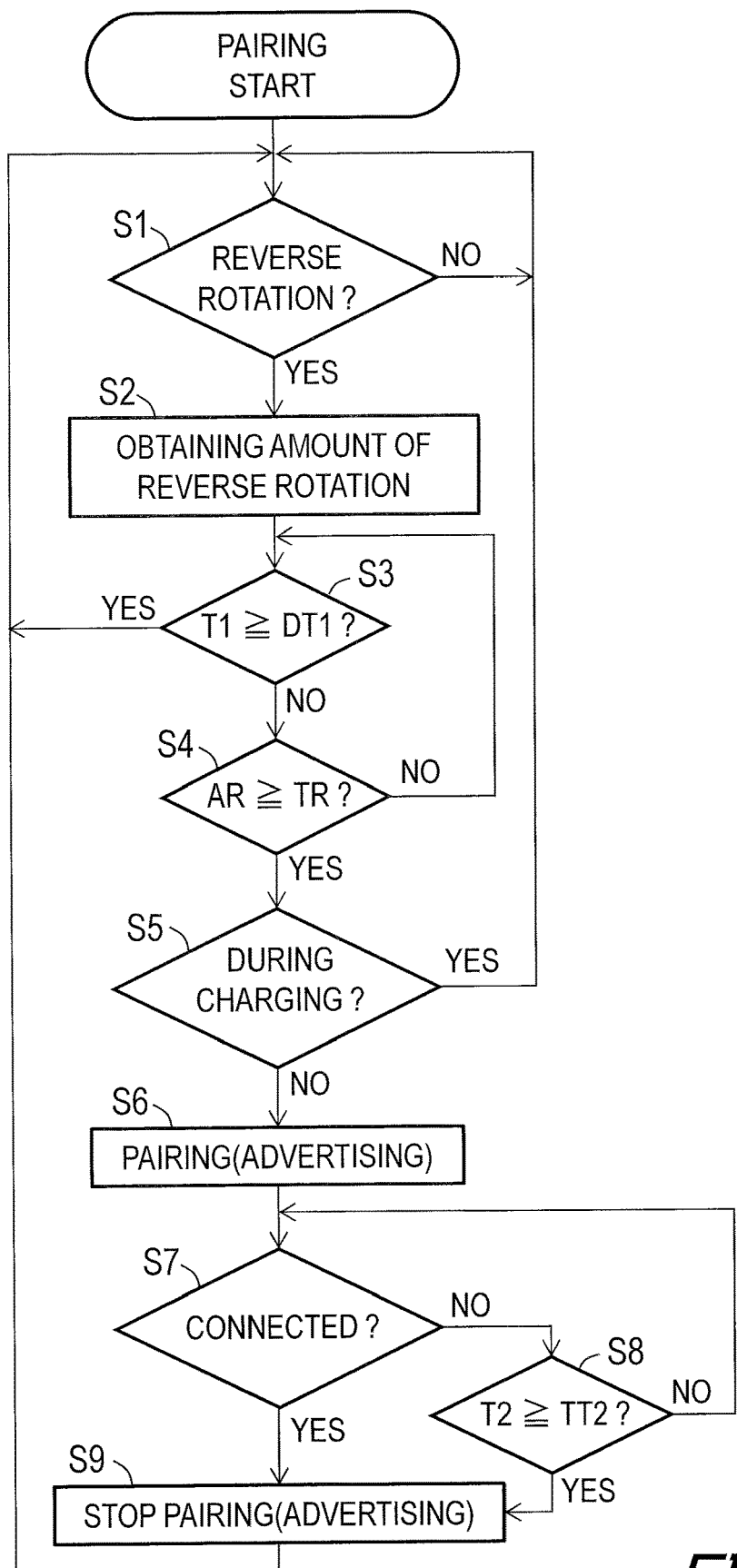
FIG. 8 is a flow chart showing pairing of the rotational device illustrated in FIG. 1.

As seen in FIG. 8, the electronic controller EC1 determines whether the rotational device 10 rotates in the reverse direction D42 based on the rotational position PS (step S1). The electronic controller EC1 obtains the amount of reverse rotation AR in a case where the electronic controller EC1 concludes that the rotational device 10 rotates in the reverse direction D42 (step S2). The electronic controller EC1 starts to measure a time T1 when the electronic controller EC1 concludes that the rotational device 10 rotates in the reverse direction D42. The electronic controller EC1 determines whether the time T1 reaches the determination time DT1 (step S3). The process returns to the step S1 in a case where the time T1 reaches the determination time DT1 before the amount of reverse rotation AR reaches the rotation threshold TR (step S3). The electronic controller EC1 determines whether the amount of reverse rotation AR is greater than or equal to the rotation threshold TR in a case where the time T1 is shorter than the determination time DT1 (steps S3 and S4). The steps S3 and S4 are repeatedly executed until one of the conditions of the steps S3 and S4 is met (steps S3 and S4).

The electronic controller EC1 determines whether the charging of the electric power source 42 is being executed in a case where the amount of reverse rotation AR is greater than or equal to the rotation threshold TR (steps S4 and S5). The process returns to the step S1 in a case where the charging of the electric power source 42 is being executed (step S5). The step S5 can be omitted from the pairing process depicted in FIG. 8 if needed or desired.

The electronic controller EC1 executes pairing in a case where the charging of the electric power source 42 is not executed (steps S5 and S6). For example, the electronic controller EC1 executes advertising in the case where the charging of the electric power source 42 is not executed (steps S5 and S6). The electronic controller EC1 wirelessly transmits the pairing signal SG1 in the case where the charging of the electric power source 42 is not executed (steps S5 and S6). The electronic controller EC1 starts to measure a time T2 when the electronic controller EC1 starts to execute pairing.

The electronic controller EC1 stops pairing in a case where the electrical device 12 is wirelessly connected to another device such as the additional electrical device 6 or the external electrical device 8 (steps S7 and S8). The electronic controller EC1 determines whether the time T2 reaches a determination time DT2 in a case where the electrical device 12 is not wirelessly connected to another device such as the additional electrical device 6 or the external electrical device 8 (steps S7 and S8).

The electronic controller EC1 keeps executing pairing until one of the conditions of the steps S7 and S8 is met (steps S7 and S8). The electronic controller EC1 stops pairing in a case where the electrical device 12 is wirelessly connected to another device such as the additional electrical device 6 or the external electrical device 8 (steps S7 and S9). The electronic controller EC1 stops pairing in a case where the time T2 is longer than or equal to the determination time DT2 before the electrical device 12 is wirelessly connected to another device (steps S7, S8, and S9). The process returns to the step S1 after the electronic controller EC1 stops pairing.

Figure 10:
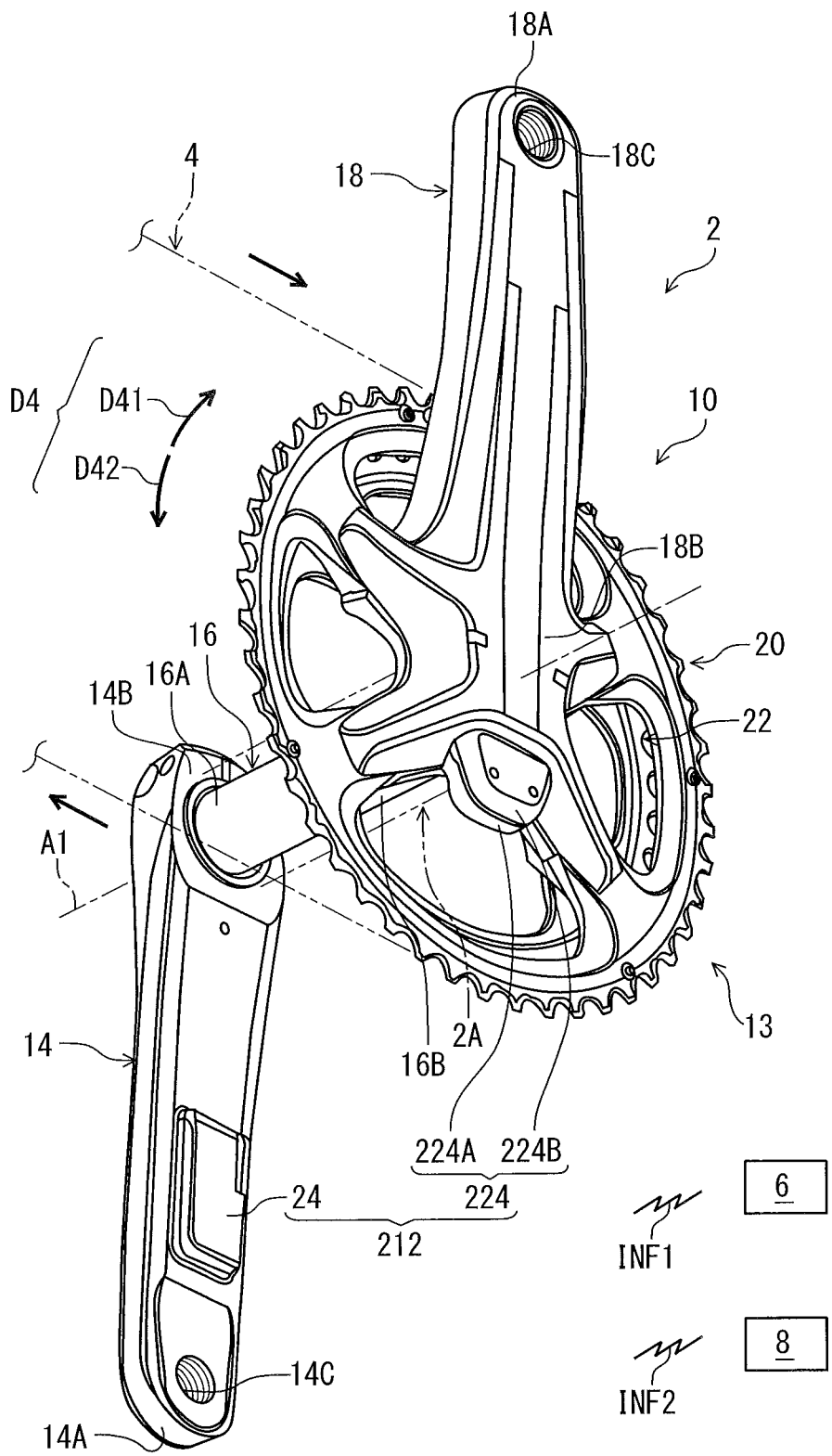
FIG. 10 is a perspective view of a rotational device in accordance with a second embodiment.

As seen in FIG. 10, the electrical device 12 can be provided to the crank arm 18 if needed or desired. In such embodiments, the rotational device 10 includes at least one of the electrical device 12 provided to the crank arm 14 and the electrical device 12 provided to the crank arm 18. The electrical device 12 provided to the crank arm 18 is configured to wirelessly transmit the rotational information INF1 of the crank arm 18 while the electrical device 12 provided to the crank arm 14 is configured to wirelessly transmit the rotational information INF1 of the crank arm 14. The additional electrical device 6 is configured to separately display the power INF11 applied to the crank arm 14 and the power INF11 applied to the crank arm 18. The additional electrical device 6 is configured to display one of the rotational speed INF12 of the crank arm 14 and the rotational speed INF12 of the crank arm 18. The additional electrical device 6 can be configured to display an average value of the rotational speed INF12 of the crank arm 14 and the rotational speed INF12 of the crank arm 18.

Figure 9:
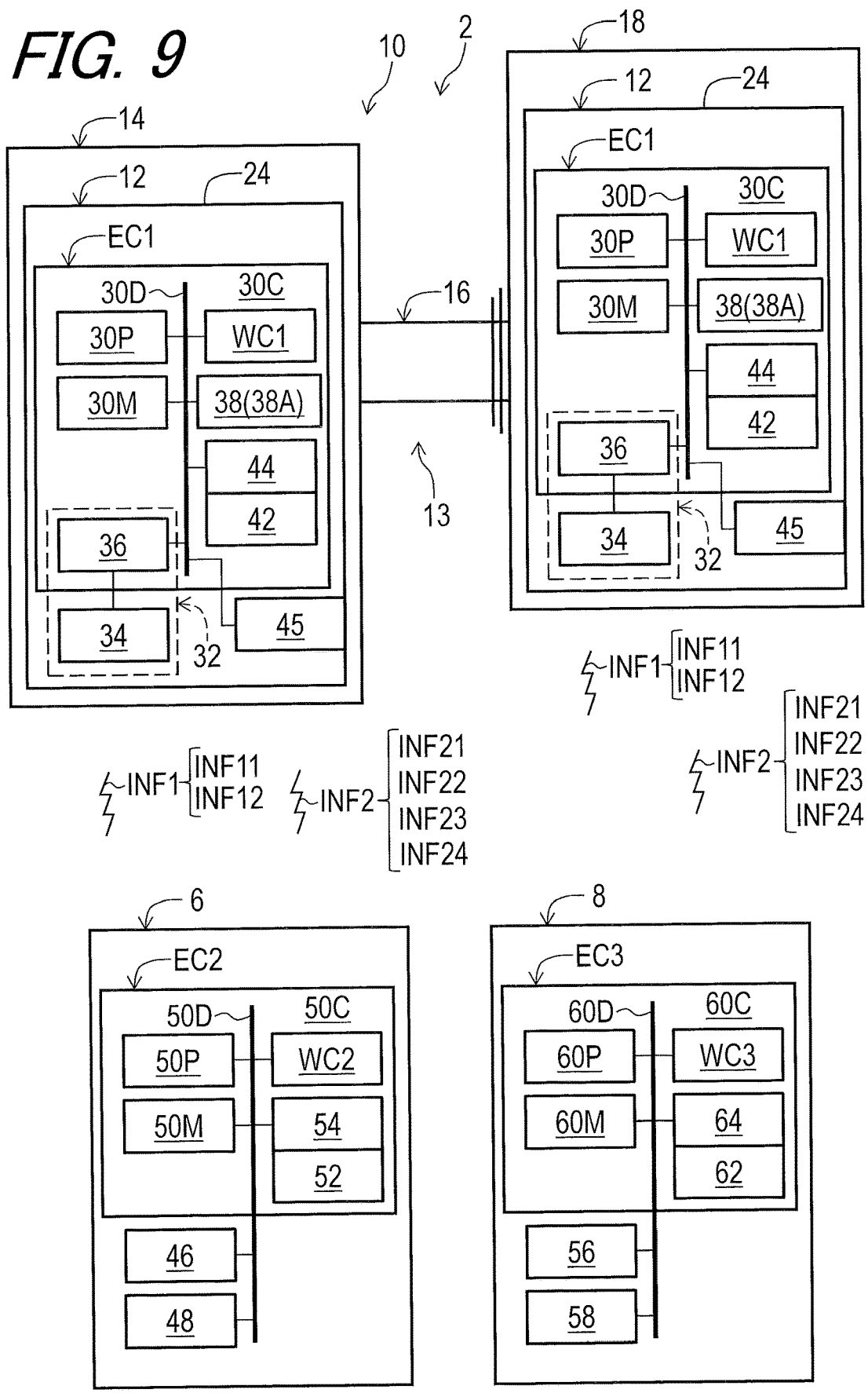
FIG. 9 is a schematic block diagram of a rotational device in accordance with a modification.

In the embodiment depicted in FIG. 9, the electrical device 12 provided to the crank arm 18 executes pairing in response to the reverse rotation of the crank assembly 13 as with the electrical device 12 provided to the crank arm 14.

Second Embodiment

A rotational device 210 in accordance with a second embodiment will be described below referring to FIGS. 10 and 11. The rotational device 210 has the same structure as those of the rotational device 10 except for the arrangement of the electrical device 12. Thus, elements having substantially the same structure as those in the first embodiment will be numbered the same here and will not be described or illustrated again in detail here for the sake of brevity.

Figure 11:
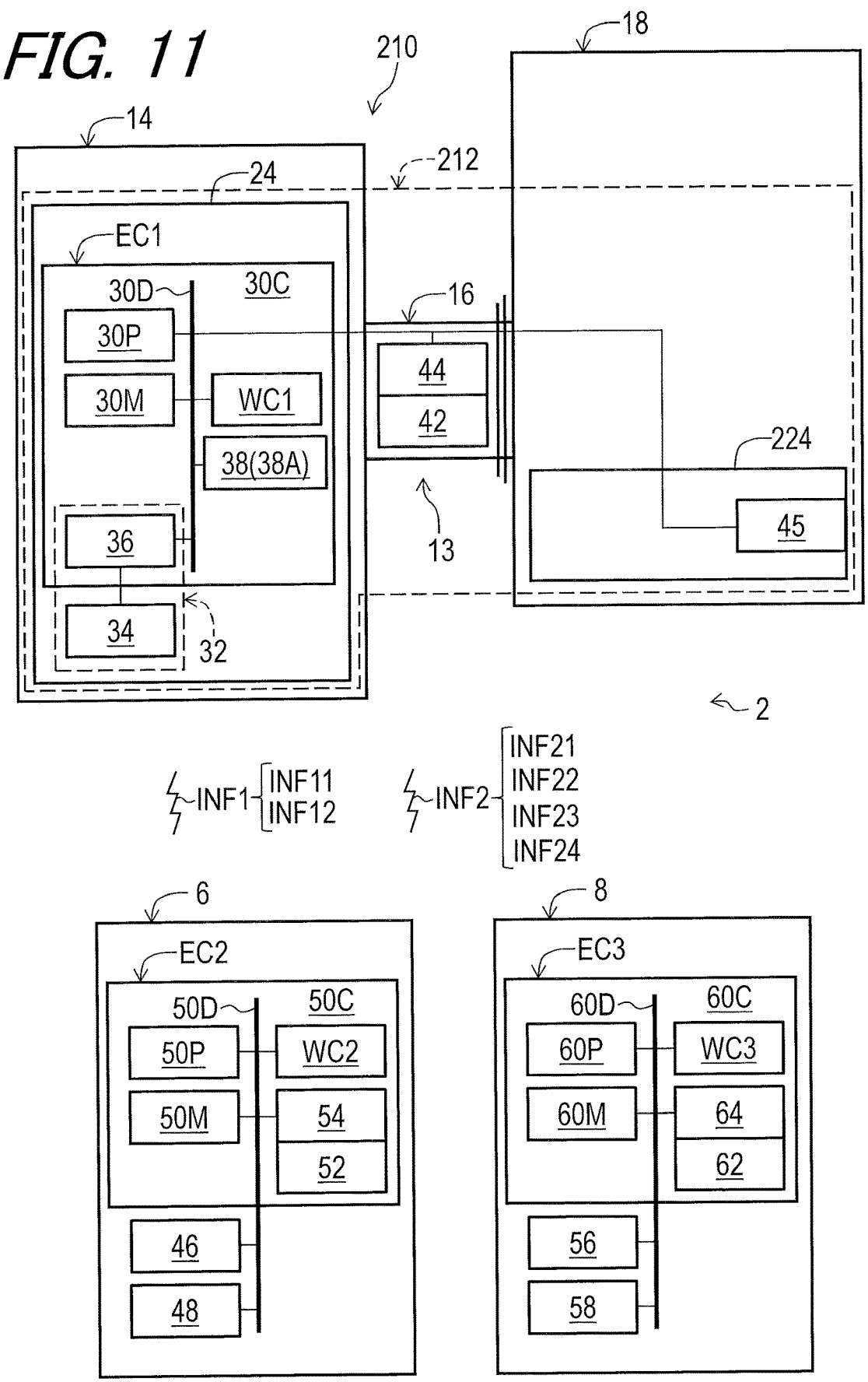
FIG. 11 is a schematic block diagram of the rotational device illustrated in FIG. 10.

As seen in FIGS. 10 and 11, the rotational device 210 comprises the crank arm 14, the crank arm 18, and the crank axle 16. The rotational device 210 of the human-powered vehicle 2 comprises an electrical device 212. The electrical device 212 has substantially the same structure as the structure of the electrical device 12 described in the first embodiment. The electrical device 212 of the rotational device 210 for the human-powered vehicle 2 comprises the wireless communicator WC1 and the electronic controller EC1. The electrical device 212 further comprises the force sensor 32. The electrical device 212 further comprises the position sensor 38.

The electrical device 212 is at least partially provided to at least one of the crank axle 16, the crank arm 14, and the sprocket 20 or 22. The electrical device 212 is at least partially provided to the crank arm 14.

As seen in FIG. 11, the electrical device 212 is partially provided to the crank arm 14, partially provided to the crank axle 16, and partially provided to the crank arm 18. The wireless communicator WC1, the electronic controller EC1, the force sensor 32, and the position sensor 38 are provided to the crank arm 14. The electric power source 42 and the power-source holder 44 are provided to the crank axle 16. The electric connector port 45 is provided to the crank arm 18. The power-source holder 44 is electrically connected to the electronic controller EC1 and the electric connector port 45 via an electric cable.

As seen in FIG. 10, the electrical device 212 includes the housing 24 and an additional housing 224. The additional housing 224 is attached to the crank arm 18. The electric connector port 45 is coupled to the additional housing 224. For example, the additional housing 224 includes a housing body 224A and a lid 224B. The housing body 224A is secured to the crank arm 18. The lid 224B is detachably and reattachably attached to the housing body 224A to cover the electric connector port 45 at least partially. The electric connector port 45 is connectable to an electric cable to charge the electric power source 42 via the electric connector port 45 and the power-source holder 44.

As seen in FIG. 4, the electronic controller EC1 is configured to determine whether the rotational device 210 rotates in the reverse direction D42 based on the rotational position PS sensed by the position sensor 38. The electronic controller EC1 is configured to determine whether the rotational device 210 rotates in the reverse direction D42 based on the radial acceleration AL1 and the rotational acceleration AL2. The electronic controller EC1 is configured to determine whether the rotational device 210 rotates in the reverse direction D42 based on the rotational position PS obtained based on the radial acceleration AL1 and the rotational acceleration AL2.

The electronic controller EC1 is configured to obtain the amount of reverse rotation AR based on the radial acceleration AL1 and the rotational acceleration AL2. The electronic controller EC1 is configured to start to obtain the amount of reverse rotation AR of the rotational device 210 based on the radial acceleration AL1 and the rotational acceleration AL2 in a case where the electronic controller EC1 recognizes the reverse rotation of the rotational device 210.

As seen in FIG. 6, the electronic controller EC1 is configured to control the wireless communicator WC1 not to execute pairing in response to the normal rotation of the rotational device 210. As seen in FIG. 7, the electronic controller EC1 is configured to control the wireless communicator WC1 to execute pairing in response to the reverse rotation of the rotational device 210. The electronic controller EC1 is configured to control the wireless communicator WC1 to wirelessly transmit the pairing signal SG1 in response to the reverse rotation of the rotational device 210. The electronic controller EC1 is configured to control the wireless communicator WC1 to wirelessly transmit the advertisement signal at advertising intervals in response to the reverse rotation of the rotational device 210.

The electronic controller EC1 is configured to control the wireless communicator WC1 to execute pairing in a case where the amount of reverse rotation AR of the rotational device 210 is greater than or equal to the rotation threshold TR. The electronic controller EC1 is configured to control the wireless communicator WC1 to execute pairing in a case where the amount of reverse rotation AR of the rotational device 210 is greater than or equal to the rotation threshold TR before the determination time DT1 elapses.

The electrical device 212 executes the pairing process described in each of the first embodiment and the modifications thereof referring to FIGS. 4 to 8. The description regarding the pairing process executed by the electrical device 12 can be utilized as the description regarding the pairing process executed by the electrical device 212 by replacing the reference numeral "10" and "12" with "210" and "212." Thus, the description regarding the pairing process of the electrical device 212 will not be described in detail here for the sake of brevity.

Figure 12:
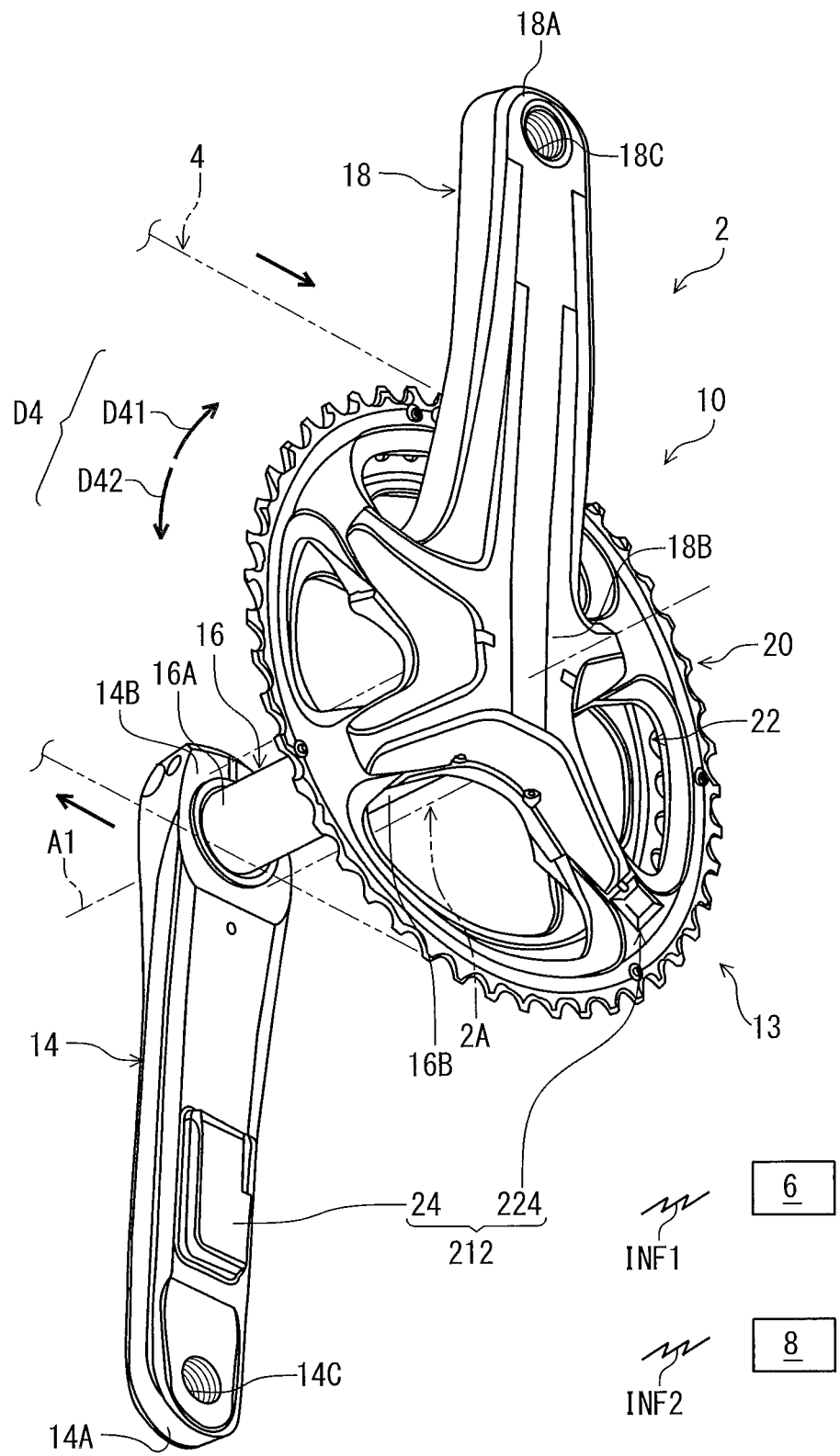
FIG. 12 is a perspective view of a rotational device in accordance with a modification.

As seen in the modification depicted in FIG. 12, the electrical device 212 can be at least partially provided to the sprocket 20 if needed or desired. The additional housing 224 can be attached to the sprocket 20 if needed or desired.

Third Embodiment

A rotational device 310 in accordance with a third embodiment will be described below referring to FIGS. 13 to 15. The rotational device 310 has the same structure as those of the rotational device 210 except for an additional force sensor. Thus, elements having substantially the same structure as those in the first and second embodiments will be numbered the same here and will not be described or illustrated again in detail here for the sake of brevity.

Figure 13:
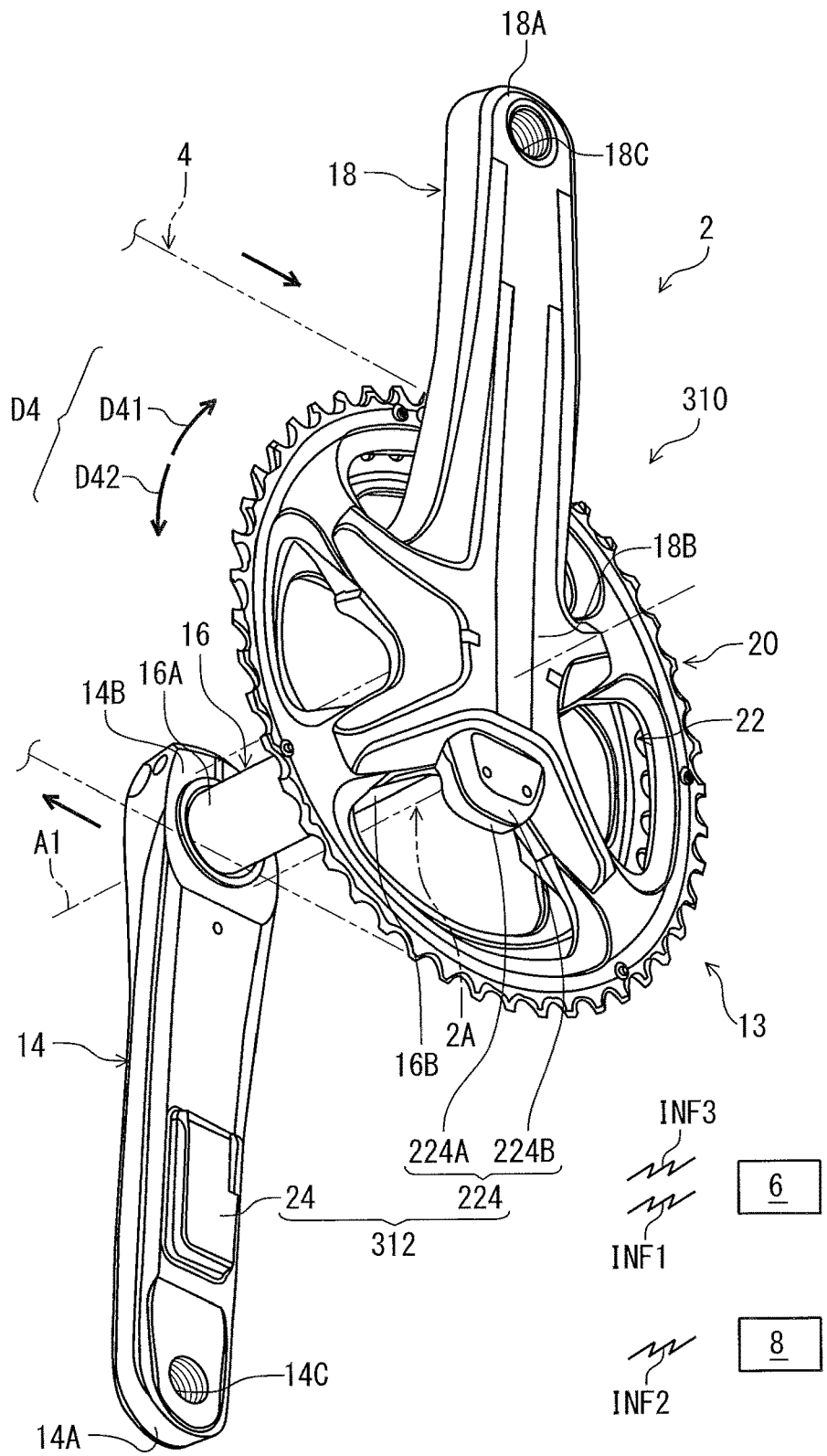
FIG. 13 is a perspective view of a rotational device in accordance with a third embodiment.
Figure 14:
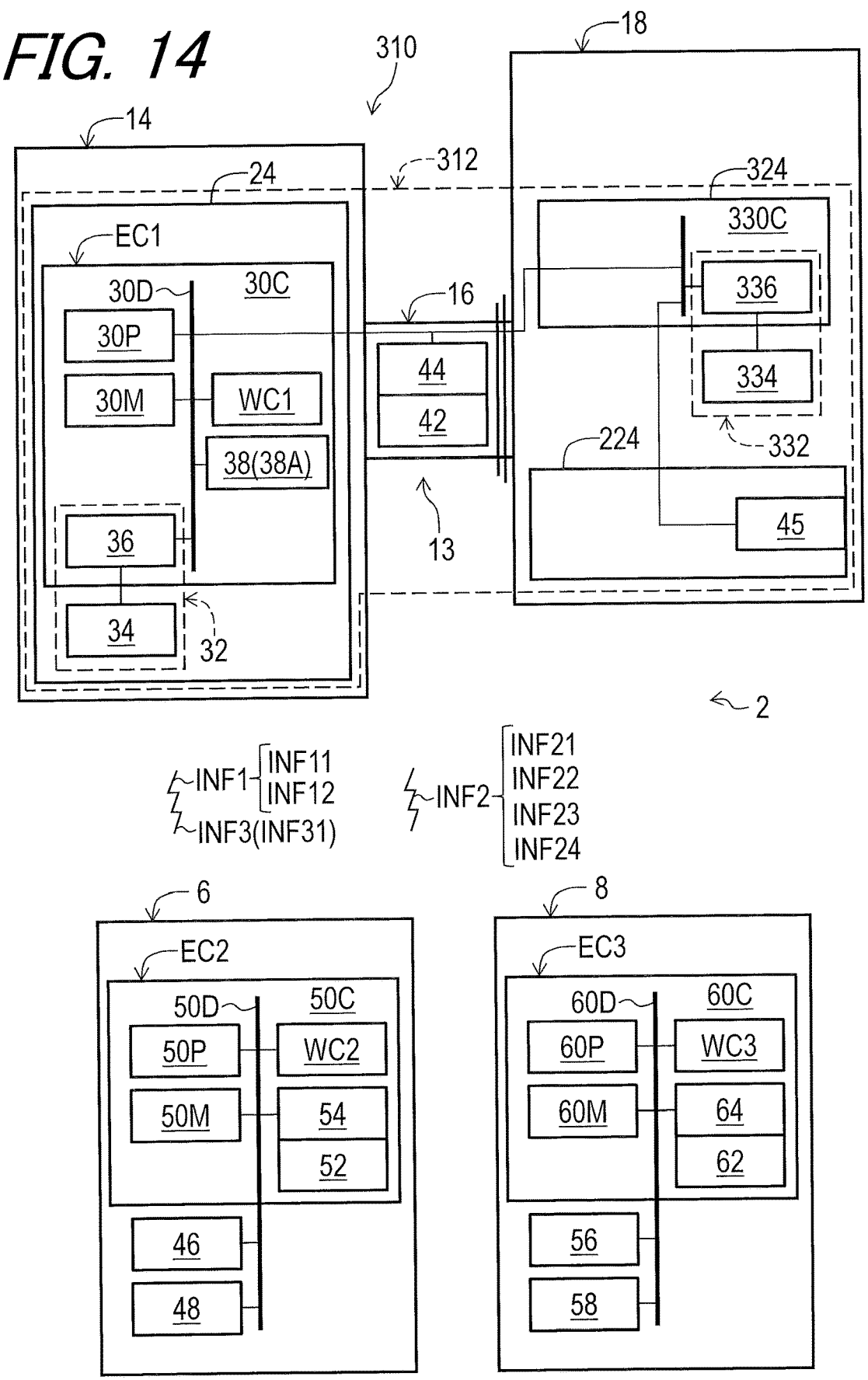
FIG. 14 is a schematic block diagram of the rotational device illustrated in FIG. 13.

As seen in FIGS. 13 and 14, the rotational device 310 comprises the crank arm 14, the crank arm 18, and the crank axle 16. The rotational device 310 of the human-powered vehicle 2 comprises an electrical device 312. The electrical device 312 has substantially the same structure as the structure of the electrical device 212 described in the second embodiment. The electrical device 312 of the rotational device 310 for the human-powered vehicle 2 comprises the wireless communicator WC1 and the electronic controller EC1. The electrical device 312 further comprises the force sensor 32. The electrical device 312 further comprises the position sensor 38. The electrical device 312 is at least partially provided to at least one of the crank axle 16, the crank arm 14, and the sprocket 20 or 22. The electrical device 312 is at least partially provided to the crank arm 14.

As seen in FIG. 14, the electrical device 312 is partially provided to the crank arm 14, partially provided to the crank axle 16, and partially provided to the crank arm 18. The wireless communicator WC1, the electronic controller EC1, the force sensor 32, and the position sensor 38 are provided to the crank arm 14. The electric power source 42 and the power-source holder 44 are provided to the crank axle 16. The electric connector port 45 is provided to the crank arm 18. The power-source holder 44 is electrically connected to the electronic controller EC1 via an electric cable. The power-source holder 44 is electrically connected to the electric connector port 45 via an electric cable.

The wireless communicator WC1 is configured to wirelessly transmit the rotational information INF1 relating to the rotational device 310. Furthermore, the wireless communicator WC1 is configured to wirelessly transmit rotational information INF3 relating to the rotational device 310. The rotational information INF3 includes at least one of: power applied to the rotational device 310; a deformation amount of the rotational device 310; a force applied to the rotational device 310; torque applied to the rotational device 310; a rotational position of the rotational device 310; and a rotational speed of the rotational device 310.

In the present embodiment, the rotational information INF3 includes power INF31 applied to the rotational device 310. The electronic controller EC1 is configured to calculate the power INF31 based on the torque applied to the rotational device 310. However, the rotational information INF3 is not limited to the power INF31.

The electrical device 312 further comprises a force sensor 332. The force sensor 332 has substantially the same structure as the structure of the force sensor 32. For example, the force sensor 332 is configured to obtain at least one of: the power applied to the rotational device 310; the deformation amount of the rotational device 310; the force applied to the rotational device 310; and the torque applied to the rotational device 310. In the present embodiment, the force sensor 332 is configured to obtain the deformation amount of the rotational device 310. The force sensor 332 is configured to obtain the deformation amount of the crank arm 18. The electronic controller EC1 is configured to receive the deformation amount obtained by the force sensor 332. The electronic controller EC1 is configured to calculate the torque applied to the rotational device 310 based on the deformation amount sensed by the force sensor 332. The electronic controller EC1 is configured to calculate the power INF31 based on the torque and the rotational speed INF12.

For example, the force sensor 332 includes a strain gauge 334 and a measurement circuit 336. The strain gauge 334 is attached to the crank arm 18. The strain gauge 334 is configured to output a change in electrical resistance depending on the deformation amount of the rotational device 310. The strain gauge 334 is configured to output the change in the electrical resistance depending on the deformation amount of the crank arm 18. The measurement circuit 336 is electrically connected to the strain gauge 334 to convert the output of the strain gauge 334 to a voltage indicating the deformation amount of the rotational device 310. The measurement circuit 336 is electrically connected to the strain gauge 334 to convert the output of the strain gauge 334 to a voltage indicating the deformation amount of the crank arm 18. For example, the measurement circuit 336 constitutes a bridge circuit with the strain gauge 334.

The measurement circuit 336 is electrically connected to the electronic controller EC1. The electrical device 312 includes a circuit board 330C provided to the crank arm 18. The electronic controller EC1, the power-source holder 44, and the electric connector port 45 are electrically connected to the circuit board 330C. The measurement circuit 336 is electrically mounted on the circuit board 330C. For example, the measurement circuit 336 is electrically connected to strain gauge 334 via the circuit board 330C and an additional circuit board such as a flexible printed circuit. The electronic controller EC1 is electrically connected to the measurement circuit 336 to receive the rotational information INF3 from the measurement circuit 336. The electronic controller EC1 is electrically connected to the measurement circuit 336 to receive the deformation amount of the crank arm 18 from the measurement circuit 336.

The electronic controller EC1 is configured to calculate the power INF31 based on the torque applied to the rotational device 310 and the rotational speed INF12 of the rotational device 310. The electronic controller EC1 is configured to control the wireless communicator WC1 to wirelessly transmit the power INF31 obtained based on the deformation amount sensed by the force sensor 332.

Figure 15:
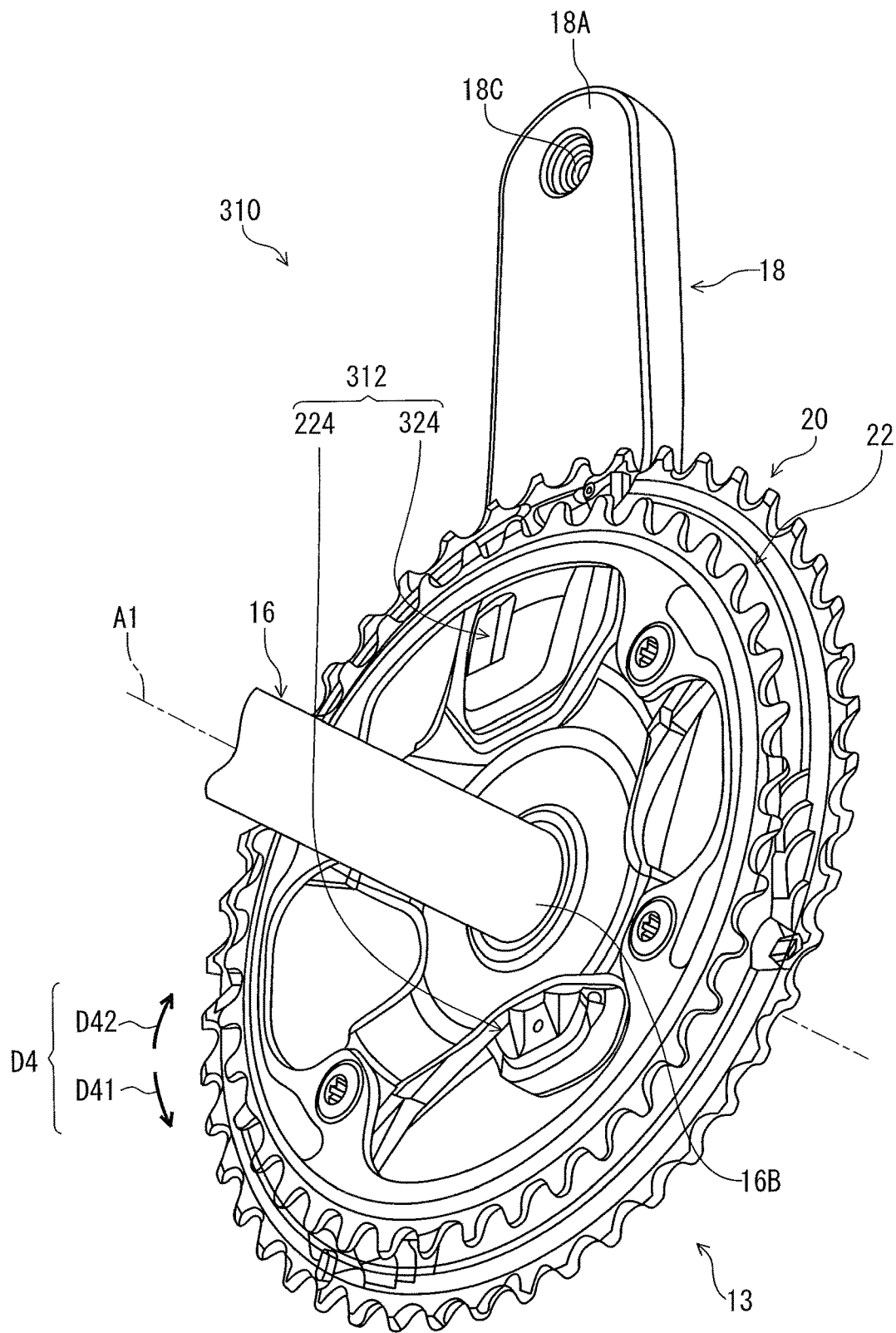
FIG. 15 is another perspective view of the rotational device illustrated in FIG. 13.

As seen in FIGS. 13 and 15, the electrical device 312 includes the housing 24, the additional housing 224, and an additional housing 324. The additional housing 324 is attached to the crank arm 18. As seen in FIG. 14, the force sensor 332 is provided in the additional housing 324. The electric connector port 45 can be coupled to the additional housing 324 if needed or desired. In such embodiments, the additional housing 224 can be omitted from the electrical device 312.

As seen in FIG. 4, the electronic controller EC1 is configured to determine whether the rotational device 310 rotates in the reverse direction D42 based on the rotational position PS sensed by the position sensor 38. The electronic controller EC1 is configured to determine whether the rotational device 310 rotates in the reverse direction D42 based on the radial acceleration AL1 and the rotational acceleration AL2. The electronic controller EC1 is configured to determine whether the rotational device 310 rotates in the reverse direction D42 based on the rotational position PS obtained based on the radial acceleration AL1 and the rotational acceleration AL2.

The electronic controller EC1 is configured to obtain the amount of reverse rotation AR based on the radial acceleration AL1 and the rotational acceleration AL2. The electronic controller EC1 is configured to start to obtain the amount of reverse rotation AR of the rotational device 310 based on the radial acceleration AL1 and the rotational acceleration AL2 in a case where the electronic controller EC1 recognizes the reverse rotation of the rotational device 310.

As seen in FIG. 6, the electronic controller EC1 is configured to control the wireless communicator WC1 not to execute pairing in response to the normal rotation of the rotational device 310. As seen in FIG. 7, the electronic controller EC1 is configured to control the wireless communicator WC1 to execute pairing in response to the reverse rotation of the rotational device 310. The electronic controller EC1 is configured to control the wireless communicator WC1 to wirelessly transmit the pairing signal SG1 in response to the reverse rotation of the rotational device 310. The electronic controller EC1 is configured to control the wireless communicator WC1 to wirelessly transmit the advertisement signal at advertising intervals in response to the reverse rotation of the rotational device 310.

The electronic controller EC1 is configured to control the wireless communicator WC1 to execute pairing in a case where the amount of reverse rotation AR of the rotational device 310 is greater than or equal to the rotation threshold TR. The electronic controller EC1 is configured to control the wireless communicator WC1 to execute pairing in a case where the amount of reverse rotation AR of the rotational device 310 is greater than or equal to the rotation threshold TR before the determination time DT1 elapses.

The electrical device 312 executes the pairing process described in each of the first embodiment and the modifications thereof referring to FIGS. 4 to 8. The description regarding the pairing process executed by the electrical device 12 can be utilized as the description regarding the pairing process executed by the electrical device 312 by replacing the reference numeral "10" and "12" with "310" and "312." Thus, the description regarding the pairing process of the electrical device 312 will not be described in detail here for the sake of brevity.

Fourth Embodiment

A rotational device 410 in accordance with a fourth embodiment will be described below referring to FIGS. 16 to 18. The rotational device 410 has the same structure as those of the rotational device 10 except that the rotational device 410 includes a pedal. Thus, elements having substantially the same structure as those in the first to third embodiments will be numbered the same here and will not be described or illustrated again in detail here for the sake of brevity.

Figure 16:
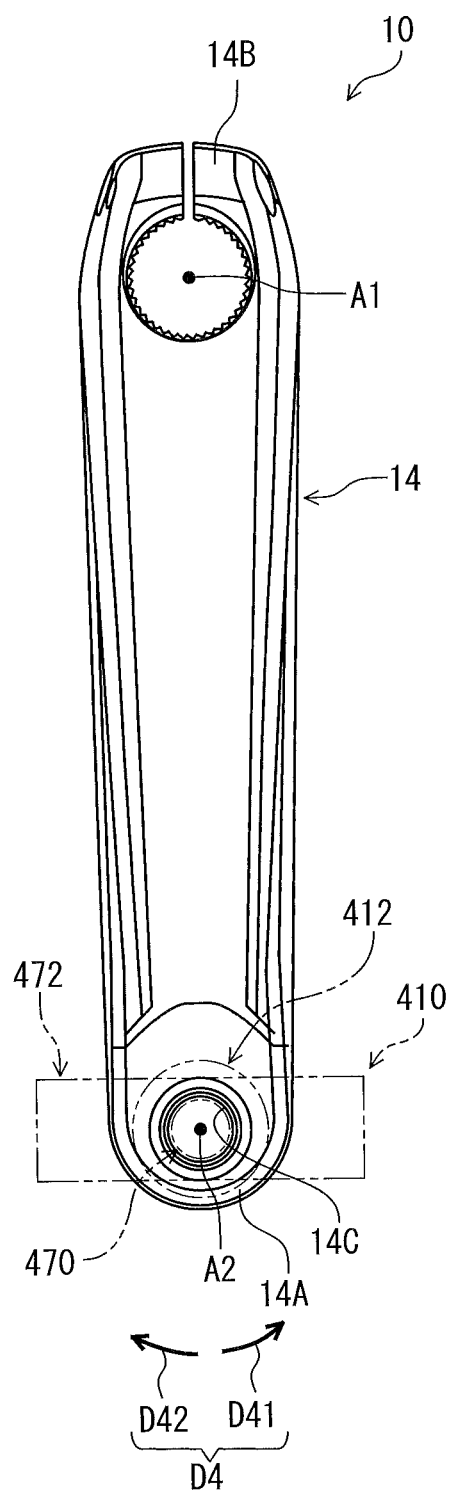
FIG. 16 is a side-elevational view of a rotational device in accordance with a fourth embodiment.
Figure 17:
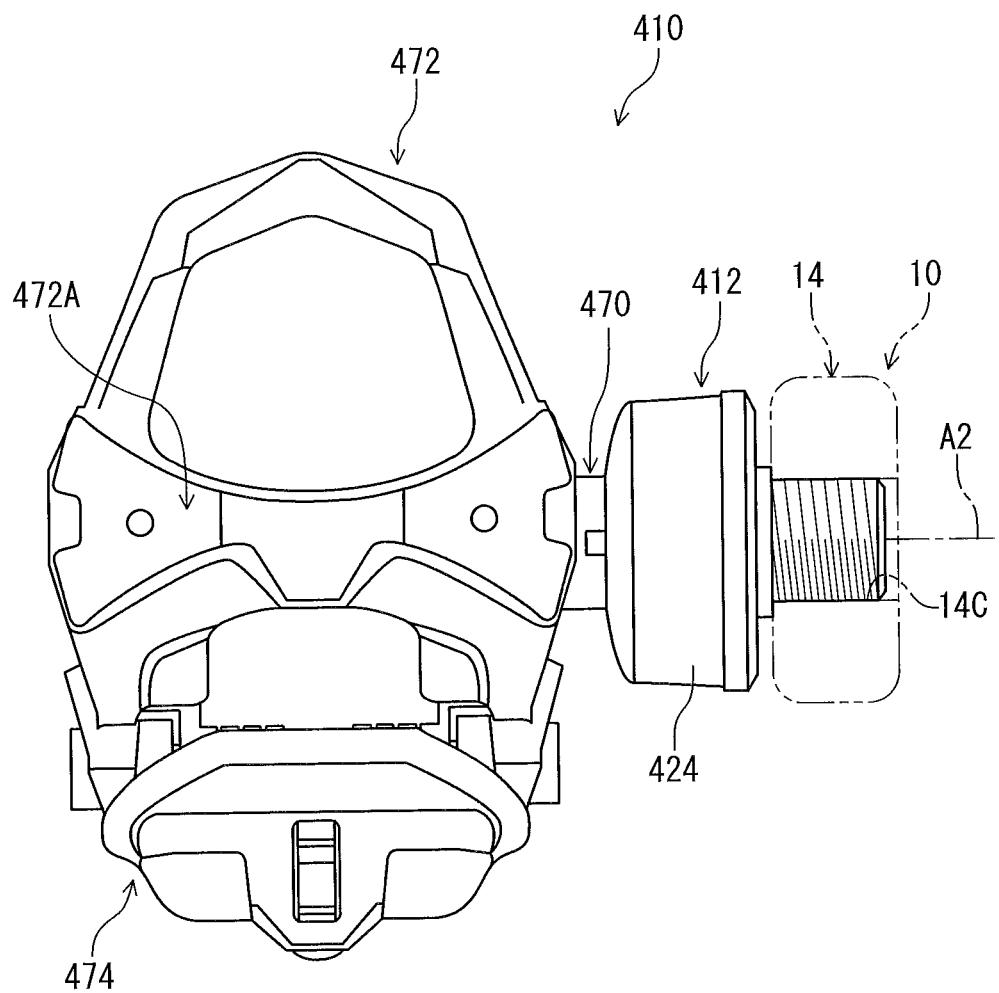
FIG. 17 is a top view of the rotational device illustrated in FIG. 16.

As seen in FIGS. 16 and 17, the rotational device 410 for the human-powered vehicle 2 comprises a pedal axle 470, a pedal body 472, and an electrical device 412. The pedal axle 470 is configured to be secured to the crank arm 14 of the rotational device 10. The pedal axle 470 includes a threaded part 470A. The threaded part 470A of the pedal axle 470 is configured to be threadedly engaged with the pedal securing hole 14C of the crank arm 14. The threaded part 470A of the pedal axle 470 can be threadedly engaged with the pedal securing hole 18C of the crank arm 18.

The pedal body 472 is rotatably coupled to the pedal axle 470. The pedal body 472 is rotatably coupled to the pedal axle 470 about a rotational axis A2. The pedal axle 470 extends along the rotational axis A2. The pedal body 472 includes a tread surface 472A on which a shoe of the user is to be put. The pedal body 472 includes a binding structure 474 to which a cleat of the shoe is to be fixedly coupled. However, the binding structure 474 can be omitted from the pedal body 472 if needed or desired.

As seen in FIG. 17, the electrical device 412 is at least partially provided to at least one of the pedal axle 470 and the pedal body 472. In the present embodiment, the electrical device 412 is entirely provided to the pedal axle 470. However, the electrical device 412 can be at least partially provided to at least one of the pedal axle 470 and the pedal body 472 if needed or desired.

Figure 18:
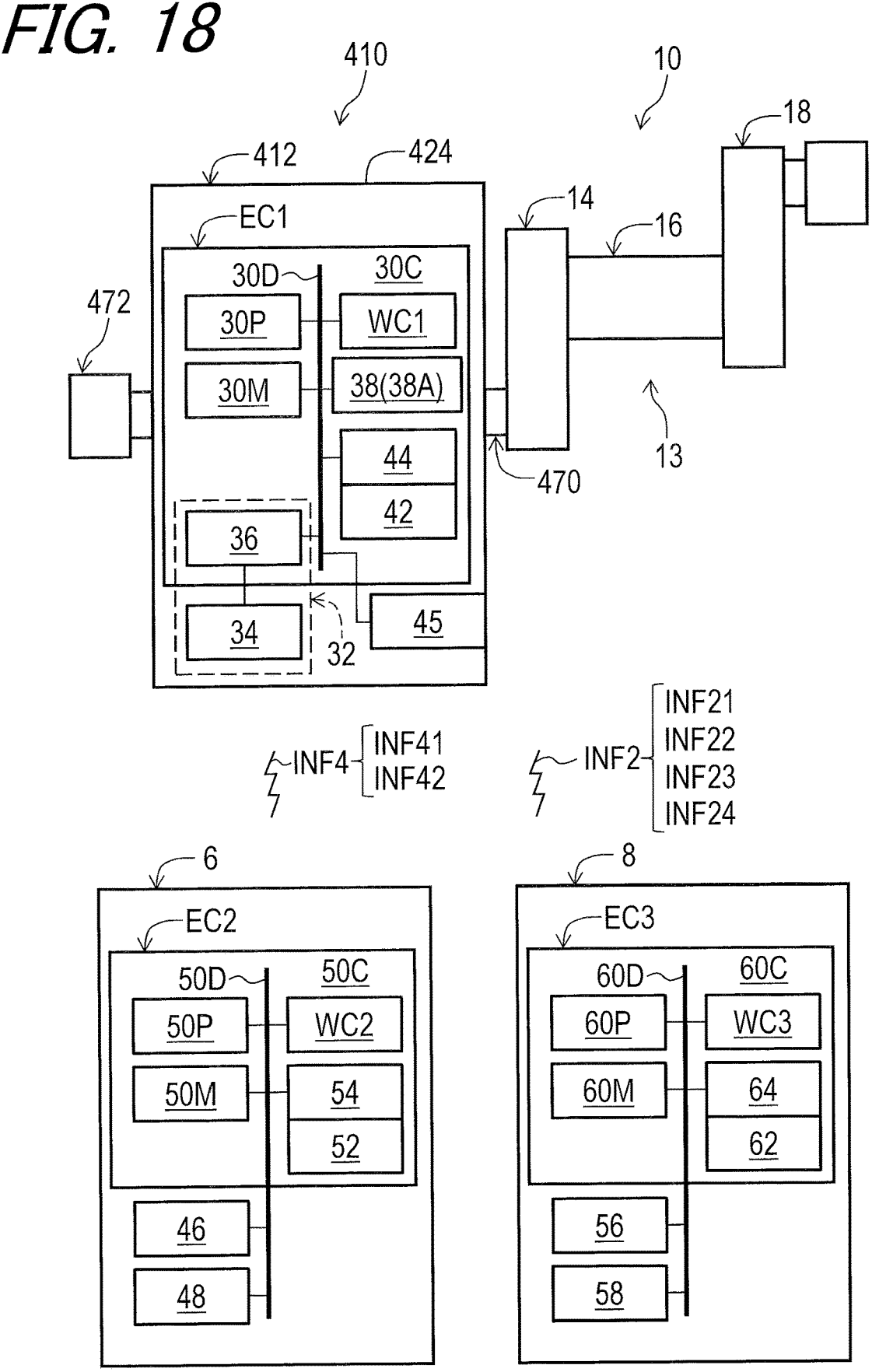
FIG. 18 is a schematic block diagram of the rotational device illustrated in FIG. 16.

As seen in FIG. 18, the electrical device 412 has substantially the same structure as the structure of the electrical device 12 described in the first embodiment. The electrical device 412 of the rotational device 410 for the human-powered vehicle 2 comprises the wireless communicator WC1 and the electronic controller EC1. The electrical device 412 further comprises the force sensor 32. The electrical device 412 further comprises the position sensor 38. The electrical device 412 comprises the electric power source 42, the power-source holder 44, and the electric connector port 45. The electrical device 412 includes a housing 424. The housing 424 is coupled to the pedal axle 470 (see e.g., FIG. 17). The wireless communicator WC1, the electronic controller EC1, the force sensor 32, the position sensor 38, the electric power source 42, and the power-source holder 44 are provided in the housing 424.

The wireless communicator WC1 is configured to wirelessly communicate with the additional wireless communicator WC2 of the additional electrical device 6. The wireless communicator WC1 is configured to wirelessly transmit the rotational information INF4 relating to the rotational device 410.

The force sensor 32 is configured to obtain the rotational information INF1. The electronic controller EC1 is configured to receive the rotational information INF1 obtained by the force sensor 32. The electronic controller EC1 is electrically connected to the force sensor 32 to receive the rotational information INF1 obtained by the force sensor 32.

The rotational information INF4 includes at least one of: power applied to the rotational device 410; a deformation amount of the rotational device 410; a force applied to the rotational device 410; torque applied to the rotational device 410; a rotational position of the rotational device 410; and a rotational speed of the rotational device 410.

In the present embodiment, the rotational information INF4 includes power INF41 applied to the rotational device 410 and a rotational speed INF42 of the rotational device 410. The electronic controller EC1 is configured to calculate the power INF41 based on the torque applied to the rotational device 410 and the rotational speed INF42 of the rotational device 410. The rotational speed INF42 is a total number of rotations of the rotational device 410. The rotational speed INF42 includes a cadence in a case where the rotational device 410 includes the crank arm 14. However, the rotational information INF4 is not limited to the power INF41 and the rotational speed INF42.

For example, the strain gauge 34 is attached to the pedal axle 470. The strain gauge 34 is configured to output a change in electrical resistance depending on the deformation amount of the rotational device 410. The strain gauge 34 is configured to output the change in the electrical resistance depending on the deformation amount of the pedal axle 470. The measurement circuit 36 is electrically connected to the strain gauge 34 to convert the output of the strain gauge 34 to a voltage indicating the deformation amount of the rotational device 410. The measurement circuit 36 is electrically connected to the strain gauge 34 to convert the output of the strain gauge 34 to a voltage indicating the deformation amount of the pedal axle 470.

The measurement circuit 36 is electrically connected to the electronic controller EC1. The measurement circuit 36 is electrically mounted on the circuit board 30C of the electronic controller EC1. For example, the measurement circuit 36 is electrically connected to strain gauge 34 via the circuit board 30C and an additional circuit board such as a flexible printed circuit. The electronic controller EC1 is electrically connected to the measurement circuit 36 to receive the rotational information INF4. The electronic controller EC1 is electrically connected to the measurement circuit 36 to receive the rotational information INF4. The electronic controller EC1 is electrically connected to the measurement circuit 36 to receive the deformation amount of the rotational device 410. The electronic controller EC1 is electrically connected to the measurement circuit 36 to receive the deformation amount of the pedal axle 470.

The position sensor 38 is configured to sense a rotational position of the rotational device 410. The position sensor 38 is configured to sense the rotational position of the rotational device 410 about the rotational axis A1. The accelerometer 38A is configured to sense acceleration applied to the electrical device 412.

Figure 19:
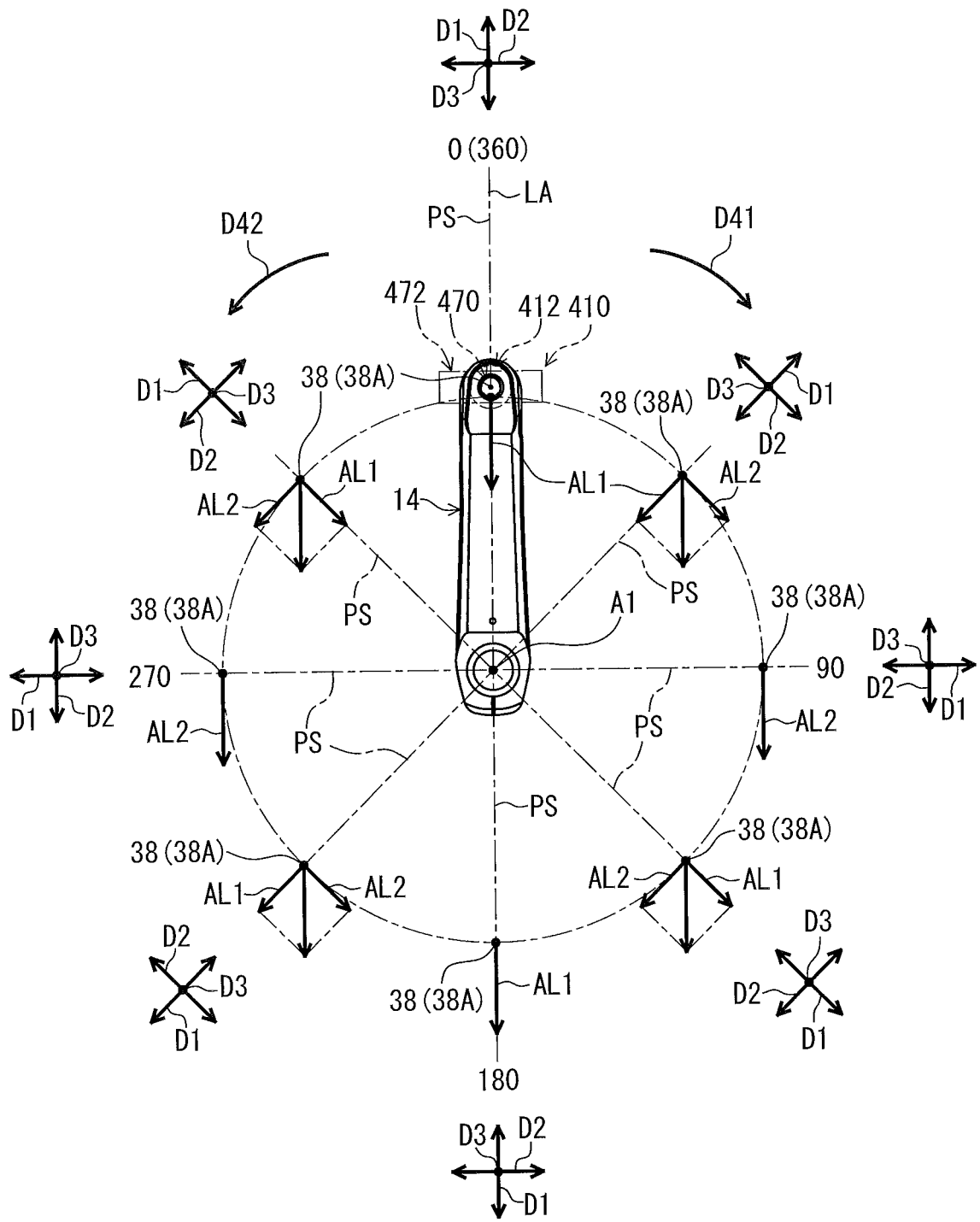
FIG. 19 is a side-elevational view of a part of the rotational device illustrated in FIG. 16 for showing directions defined with respect to the rotational device, acceleration applied to the rotational device.

As seen in FIG. 19, the accelerometer 38A is configured to sense radial acceleration AL1 defined in the radial direction D1 with respect to the rotational axis A1 of the rotational device 410. The accelerometer 38A is configured to sense rotational acceleration AL2 defined in the rotational direction D2 with respect to the rotational axis A1. The accelerometer 38A is configured to sense axial acceleration AL3 defined in the axial direction D3 parallel to the rotational axis A1 of the rotational device 410.

As seen in FIG. 18, the electronic controller EC1 is electrically connected to the position sensor 38 to obtain the rotational position sensed by the position sensor 38. The electronic controller EC1 is configured to obtain the rotational position PS based on the radial acceleration AL1 and the rotational acceleration AL2 which are sensed by the accelerometer 38A. The electronic controller EC1 is configured to obtain the rotational position PS of the rotational device 10 at predetermined intervals based on the radial acceleration AL1 and the rotational acceleration AL2.

As seen in FIG. 19, the electronic controller EC1 is configured to determine whether the rotational device 410 rotates in the reverse direction D42 based on the rotational position PS sensed by the position sensor 38. The electronic controller EC1 is configured to determine whether the rotational device 410 rotates in the reverse direction D42 based on the radial acceleration AL1 and the rotational acceleration AL2. The electronic controller EC1 is configured to determine whether the rotational device 410 rotates in the reverse direction D42 based on the rotational position PS obtained based on the radial acceleration AL1 and the rotational acceleration AL2.

The electronic controller EC1 is configured to obtain the amount of reverse rotation AR based on the radial acceleration AL1 and the rotational acceleration AL2. The electronic controller EC1 is configured to start to obtain the amount of reverse rotation AR of the rotational device 410 based on the radial acceleration AL1 and the rotational acceleration AL2 in a case where the electronic controller EC1 recognizes the reverse rotation of the rotational device 410.

Figure 20:
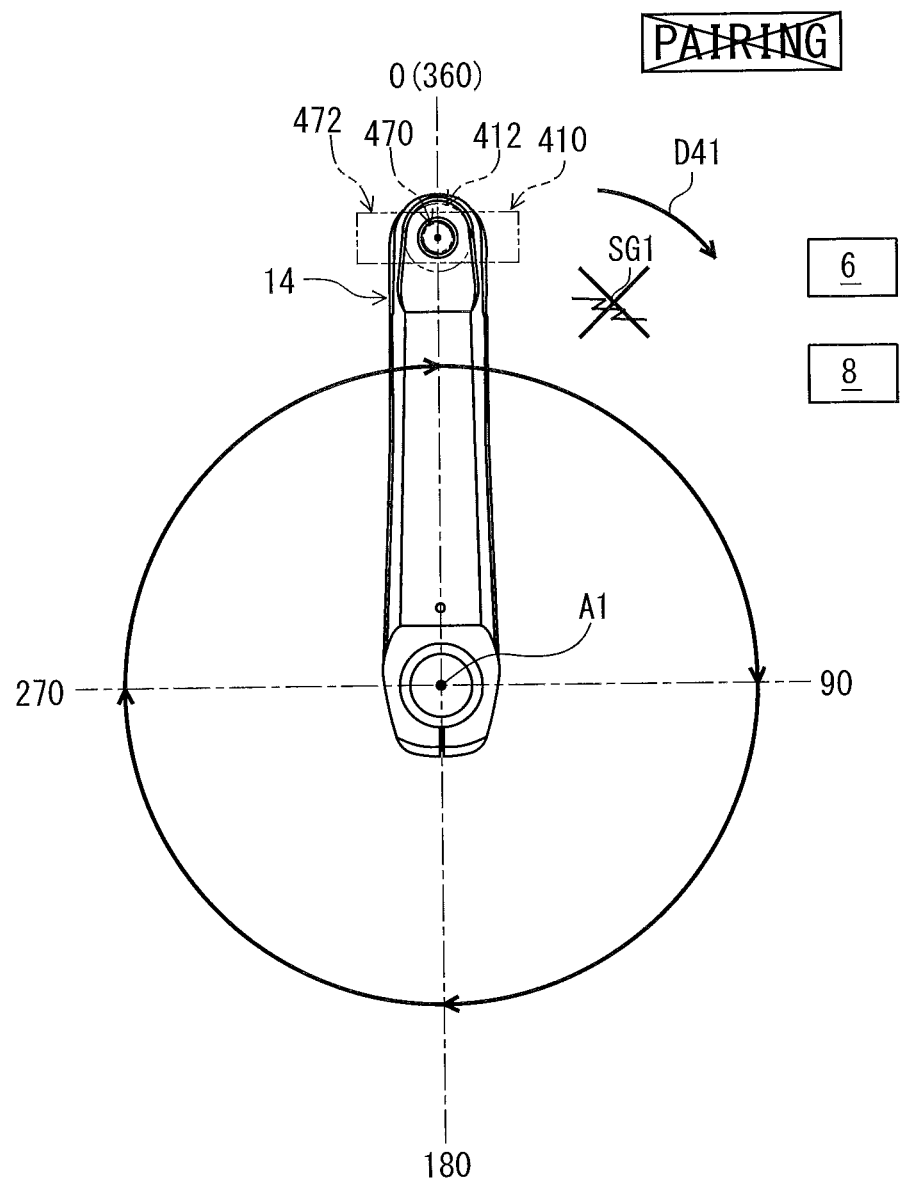
FIG. 20 is a side-elevational view of the rotational device illustrated in FIG. 16 for showing normal rotation.
Figure 21:
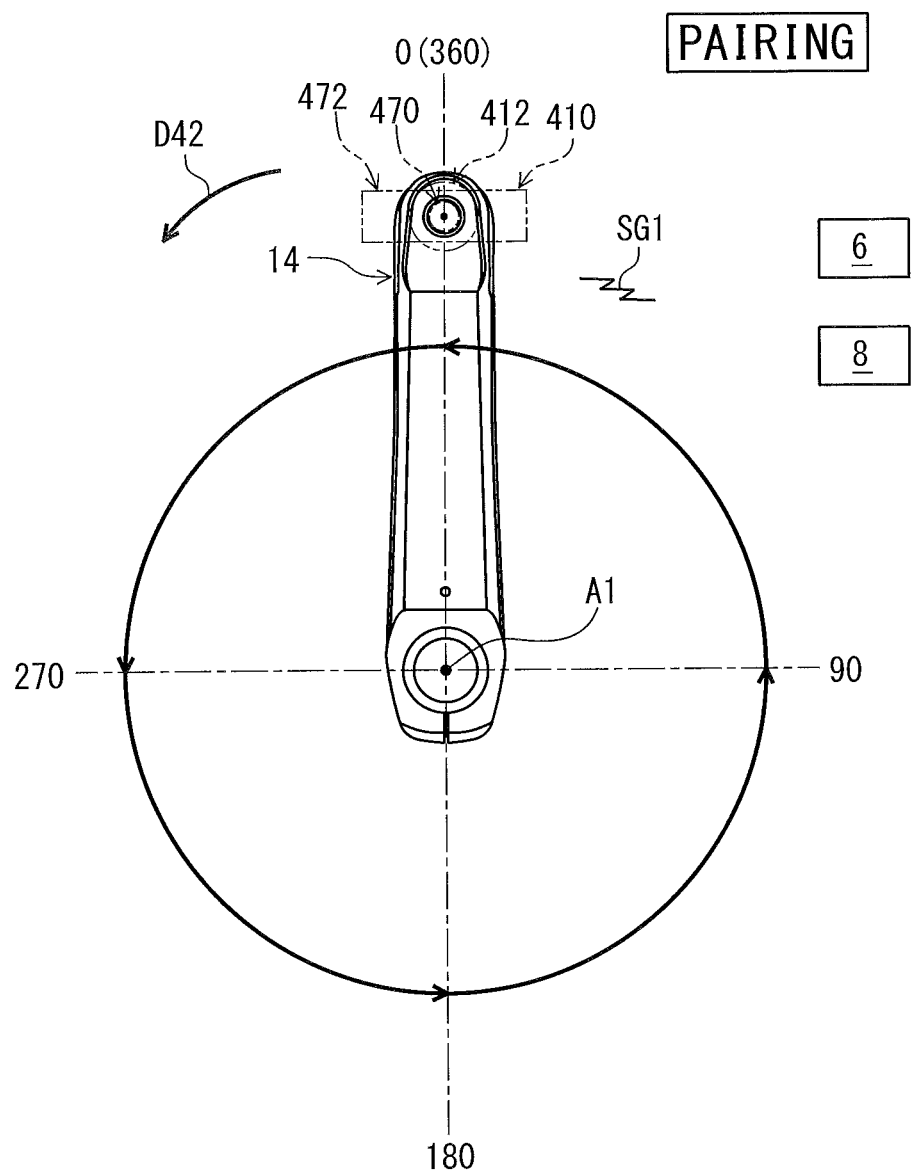
FIG. 21 is a side-elevational view of the rotational device illustrated in FIG. 16 for showing reverse rotation.

As seen in FIG. 20, the electronic controller EC1 is configured to control the wireless communicator WC1 not to execute pairing in response to the normal rotation of the rotational device 410. As seen in FIG. 21, the electronic controller EC1 is configured to control the wireless communicator WC1 to execute pairing in response to the reverse rotation of the rotational device 410. The electronic controller EC1 is configured to control the wireless communicator WC1 to wirelessly transmit the pairing signal SG1 in response to the reverse rotation of the rotational device 410. The electronic controller EC1 is configured to control the wireless communicator WC1 to wirelessly transmit the advertisement signal at advertising intervals in response to the reverse rotation of the rotational device 410.

The electronic controller EC1 is configured to control the wireless communicator WC1 to execute pairing in a case where the amount of reverse rotation AR of the rotational device 410 is greater than or equal to the rotation threshold TR. The electronic controller EC1 is configured to control the wireless communicator WC1 to execute pairing in a case where the amount of reverse rotation AR of the rotational device 410 is greater than or equal to the rotation threshold TR before the determination time DT1 elapses.

The electrical device 412 executes the pairing process described in each of the first embodiment and the modifications thereof referring to FIGS. 4 to 8. The description regarding the pairing process executed by the electrical device 12 can be utilized as the description regarding the pairing process executed by the electrical device 412 by replacing the reference numeral "10" and "12" with "410" and "412." Thus, the description regarding the pairing process of the electrical device 412 will not be described in detail here for the sake of brevity.

Fifth Embodiment

A rotational device 510 in accordance with a fifth embodiment will be described below referring to FIGS. 22 and 23. The rotational device 510 has the same structure as those of the rotational device 10 except that the rotational device 510 includes a wheel. Thus, elements having substantially the same structure as those in the first to fourth embodiments will be numbered the same here and will not be described or illustrated again in detail here for the sake of brevity.

Figure 22:
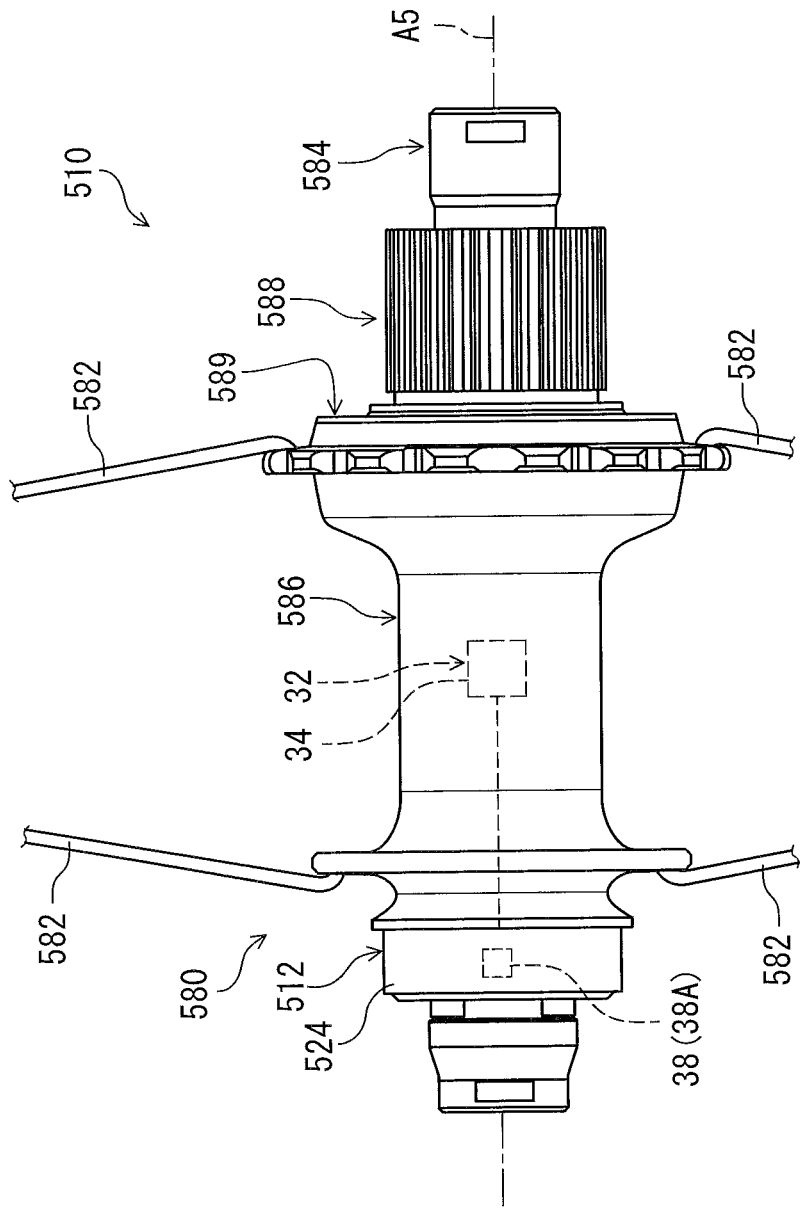
FIG. 22 is a side-elevational view of a rotational device in accordance with a fifth embodiment.
Figure 23:
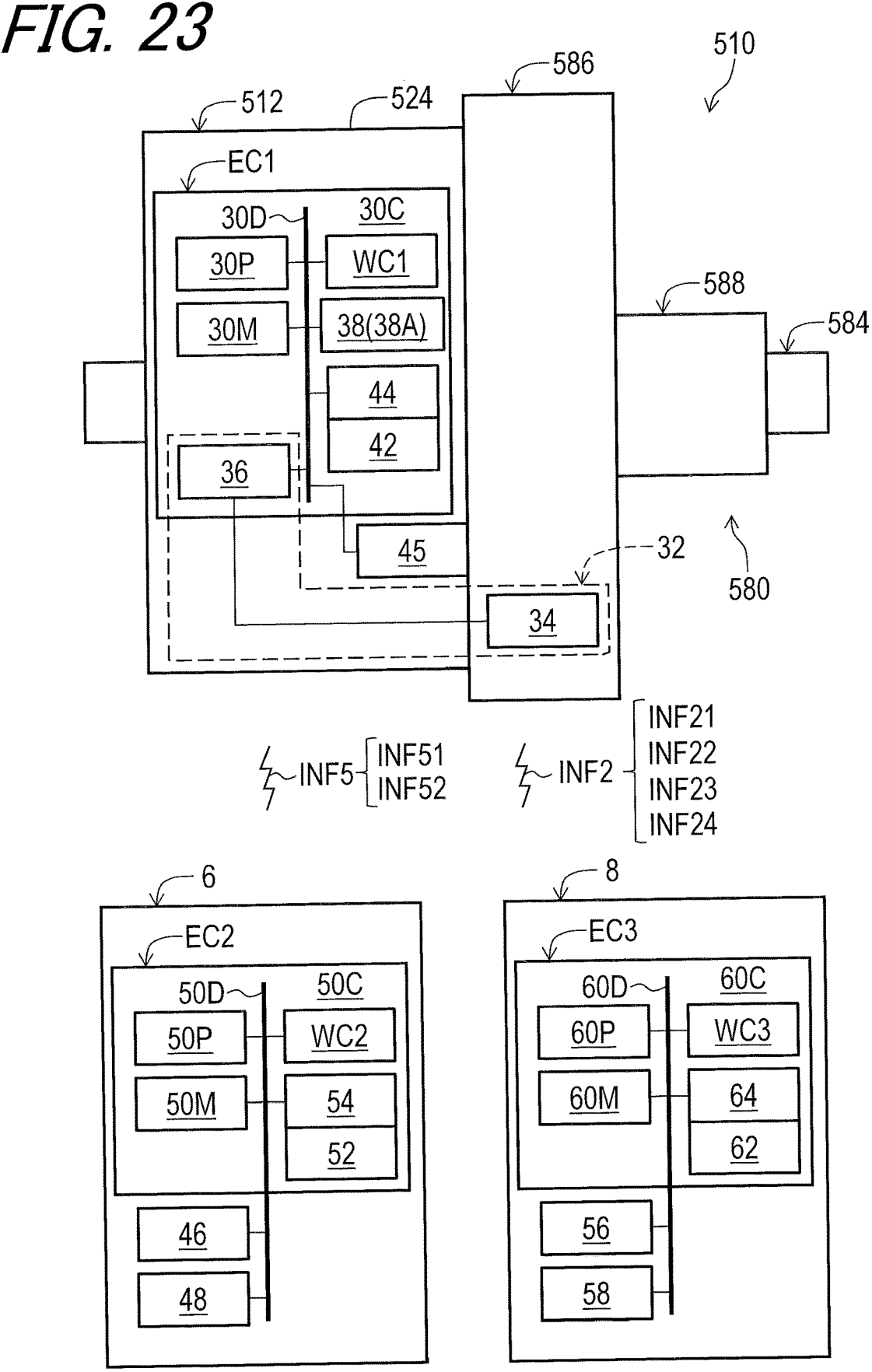
FIG. 23 is a schematic block diagram of the rotational device illustrated in FIG. 20.

As seen in FIGS. 22 and 23, the rotational device 510 for the human-powered vehicle 2 comprises a hub assembly 580, at least two spokes 582, and a rim. The rotational device 510 of the human-powered vehicle 2 comprises an electrical device 512. The electrical device 312 has substantially the same structure as the structure of the electrical device 12 described in the first embodiment.

The at least two spokes 582 couples the hub assembly 580 and the rim. The hub assembly 580 includes a hub axle 584, a hub body 586, a sprocket support body 588, and a ratchet structure 589. The hub body 586 is rotatably supported by the hub axle 584 about a rotational axis A5. The at least two spokes 582 couples the hub body 586 and the rim. The sprocket support body 588 is rotatably supported by the hub axle 584 about the rotational axis A5. A sprocket assembly is mounted on the sprocket support body 588. The force is transmitted from the crank assembly 13 to the sprocket support body 588 via the chain 4 and the sprocket assembly.

The ratchet structure 589 couples the hub body 586 and the sprocket support body 588 to restrict the sprocket support body 588 from rotating relative to the hub body 586 about the rotational axis A5 in one rotational direction. The ratchet structure 589 couples the hub body 586 and the sprocket support body 588 so that the sprocket support body 588 is rotatable relative to the hub body 586 about the rotational axis A5 in the other rotational direction. Thus, the force is transmitted from the crank assembly 13 to the hub body 586 via the sprocket support body 588 and the ratchet structure 589 in only the one rotational direction.

The electrical device 512 is at least partially provided to at least one of the hub axle 584, the hub body 586, and the sprocket support body 588. In the present embodiment, the electrical device 512 is entirely provided to the hub body 586. However, the electrical device 512 can be at least partially provided to at least one of the hub axle 584, the hub body 586, and the sprocket support body 588 if needed or desired.

As seen in FIG. 23, the electrical device 512 of the rotational device 510 for the human-powered vehicle 2 comprises the wireless communicator WC1 and the electronic controller EC1. The electrical device 512 further comprises the force sensor 32. The electrical device 512 further comprises the position sensor 38. The electrical device 512 comprises the electric power source 42, the power-source holder 44, the electric connector port 45. The electrical device 512 includes a housing 524. The housing 524 is coupled to the hub body 586 (see e.g., FIG. 22). The wireless communicator WC1, the electronic controller EC1, the position sensor 38, the electric power source 42, and the power-source holder 44 are provided in the housing 524. The force sensor 32 is at least partially provided outside the housing 524 and partially attached to the hub body 586.

The wireless communicator WC1 is configured to wirelessly communicate with the additional wireless communicator WC2 of the additional electrical device 6. The wireless communicator WC1 is configured to wirelessly transmit the rotational information INF5 relating to the rotational device 510.

The force sensor 32 is configured to obtain the rotational information INF5. The electronic controller EC1 is configured to receive the rotational information INF5 obtained by the force sensor 32. The electronic controller EC1 is electrically connected to the force sensor 32 to receive the rotational information INF5 obtained by the force sensor 32.

The rotational information INF5 includes at least one of: power applied to the rotational device 510; a deformation amount of the rotational device 510; a force applied to the rotational device 510; torque applied to the rotational device 510; a rotational position of the rotational device 510; and a rotational speed of the rotational device 510.

In the present embodiment, the rotational information INF5 includes power INF51 applied to the rotational device 510 and a rotational speed INF52 of the rotational device 510. The electronic controller EC1 is configured to calculate the power INF51 based on the torque applied to the rotational device 510 and the rotational speed INF52 of the rotational device 510. The rotational speed INF52 is a total number of rotations of the rotational device 510. The rotational speed INF52 includes a cadence in a case where the rotational device 510 includes the crank arm 14. However, the rotational information INF5 is not limited to the power INF51 and the rotational speed INF52.

For example, the strain gauge 34 is attached to the hub axle 584. The strain gauge 34 is configured to output a change in electrical resistance depending on the deformation amount of the rotational device 510. The strain gauge 34 is configured to output the change in the electrical resistance depending on the deformation amount of the hub axle 584. The measurement circuit 36 is electrically connected to the strain gauge 34 to convert the output of the strain gauge 34 to a voltage indicating the deformation amount of the rotational device 510. The measurement circuit 36 is electrically connected to the strain gauge 34 to convert the output of the strain gauge 34 to a voltage indicating the deformation amount of the hub axle 584.

The measurement circuit 36 is electrically connected to the electronic controller EC1. The measurement circuit 36 is electrically mounted on the circuit board 30C of the electronic controller EC1. For example, the measurement circuit 36 is electrically connected to strain gauge 34 via the circuit board 30C and an additional circuit board such as a flexible printed circuit. The electronic controller EC1 is electrically connected to the measurement circuit 36 to receive the rotational information INF5. The electronic controller EC1 is electrically connected to the measurement circuit 36 to receive the rotational information INF5. The electronic controller EC1 is electrically connected to the measurement circuit 36 to receive the deformation amount of the rotational device 510. The electronic controller EC1 is electrically connected to the measurement circuit 36 to receive the deformation amount of the hub axle 584.

The position sensor 38 is configured to sense a rotational position of the rotational device 510. The position sensor 38 is configured to sense the rotational position of the rotational device 510 about the rotational axis A1. The accelerometer 38A is configured to sense acceleration applied to the electrical device 512.

Figure 24:
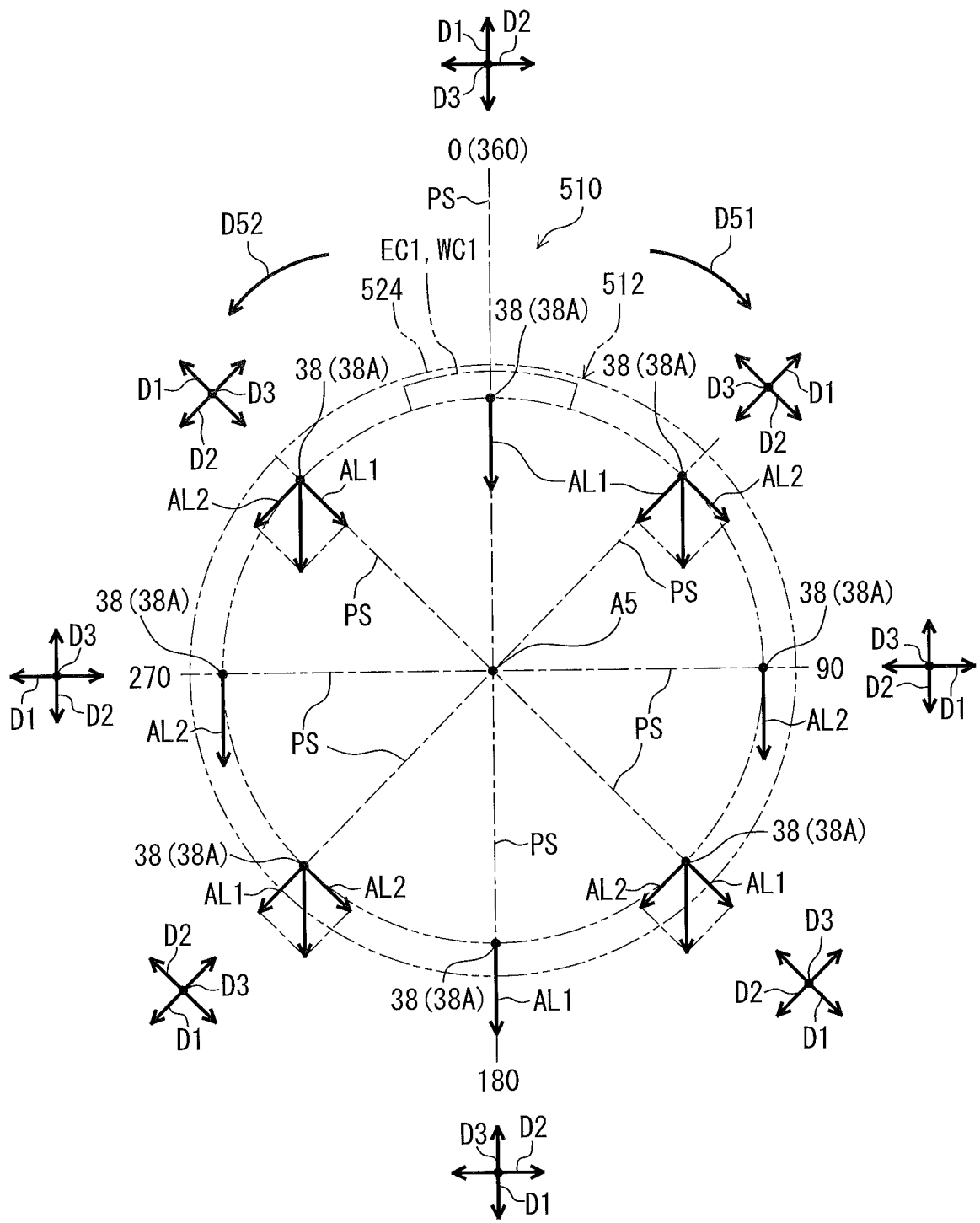
FIG. 24 is a side-elevational view of a part of the rotational device illustrated in FIG. 22 for showing directions defined with respect to the rotational device, acceleration applied to the rotational device.

As seen in FIG. 24, the rotational device 510 is rotatable relative to the vehicle body 2A of the human-powered vehicle 2 about the rotational axis A1 in a driving rotational direction D51 while the human-powered vehicle 2 moves forward. The rotational device 510 is rotatable relative to the vehicle body 2A about the rotational axis A5 in a crank rotational direction D5. The crank rotational direction D5 includes the driving rotational direction D51 and a reverse direction D52. The reverse direction D52 is an opposite direction of the driving rotational direction D51.

The accelerometer 38A is configured to sense radial acceleration AL1 defined in the radial direction D1 with respect to the rotational axis A1 of the rotational device 510. The accelerometer 38A is configured to sense rotational acceleration AL2 defined in the rotational direction D2 with respect to the rotational axis A1. The accelerometer 38A is configured to sense axial acceleration AL3 defined in the axial direction D3 parallel to the rotational axis A1 of the rotational device 510.

As seen in FIG. 23, the electronic controller EC1 is electrically connected to the position sensor 38 to obtain the rotational position sensed by the position sensor 38. The electronic controller EC1 is configured to obtain the rotational position PS based on the radial acceleration AL1 and the rotational acceleration AL2 which are sensed by the accelerometer 38A. The electronic controller EC1 is configured to obtain the rotational position PS of the rotational device 10 at predetermined intervals based on the radial acceleration AL1 and the rotational acceleration AL2.

As seen in FIG. 24, the electronic controller EC1 is configured to determine whether the rotational device 510 rotates in the reverse direction D42 based on the rotational position PS sensed by the position sensor 38. The electronic controller EC1 is configured to determine whether the rotational device 510 rotates in the reverse direction D42 based on the radial acceleration AL1 and the rotational acceleration AL2. The electronic controller EC1 is configured to determine whether the rotational device 510 rotates in the reverse direction D42 based on the rotational position PS obtained based on the radial acceleration AL1 and the rotational acceleration AL2.

The electronic controller EC1 is configured to obtain the amount of reverse rotation AR based on the radial acceleration AL1 and the rotational acceleration AL2. The electronic controller EC1 is configured to start to obtain the amount of reverse rotation AR of the rotational device 510 based on the radial acceleration AL1 and the rotational acceleration AL2 in a case where the electronic controller EC1 recognizes the reverse rotation of the rotational device 510.

Figure 25:
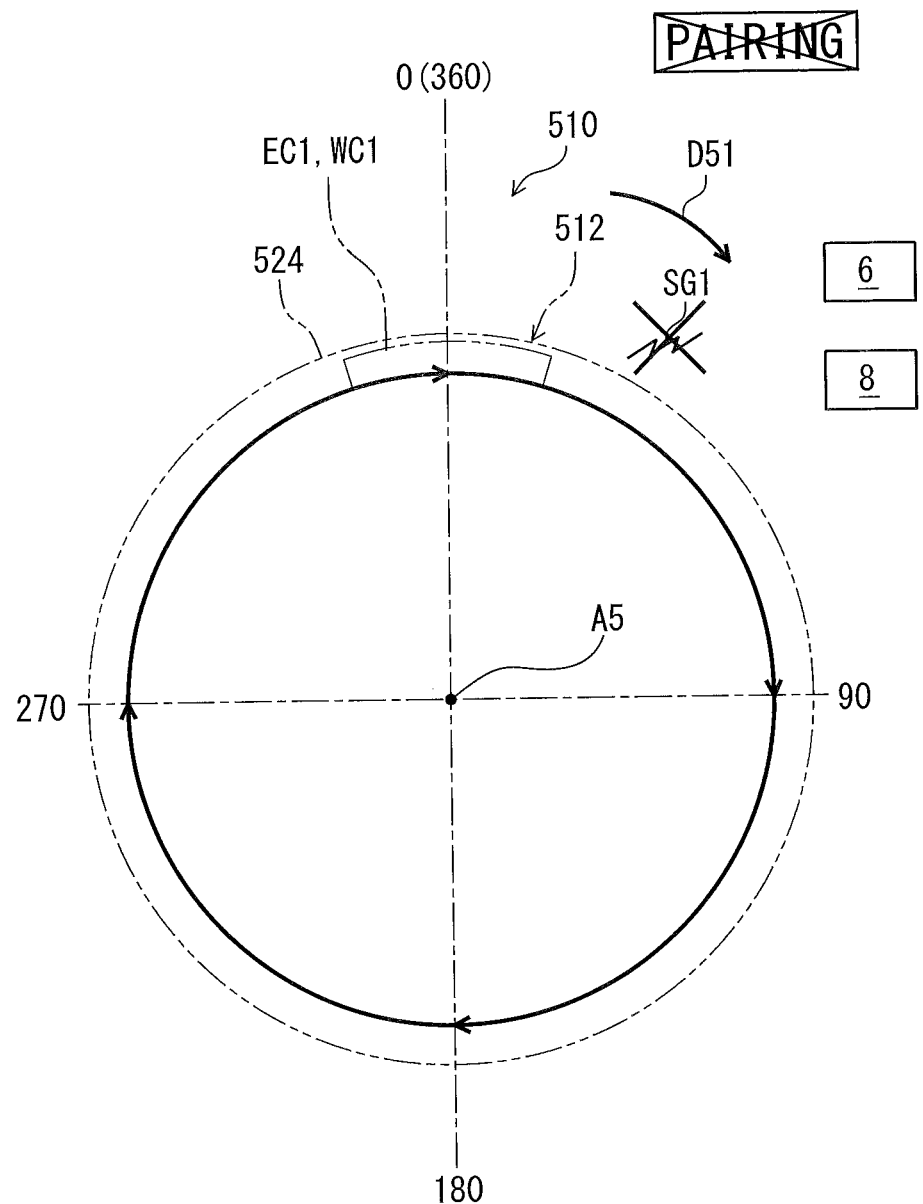
FIG. 25 is a side-elevational view of the rotational device illustrated in FIG. 22 for showing normal rotation.
Figure 26:
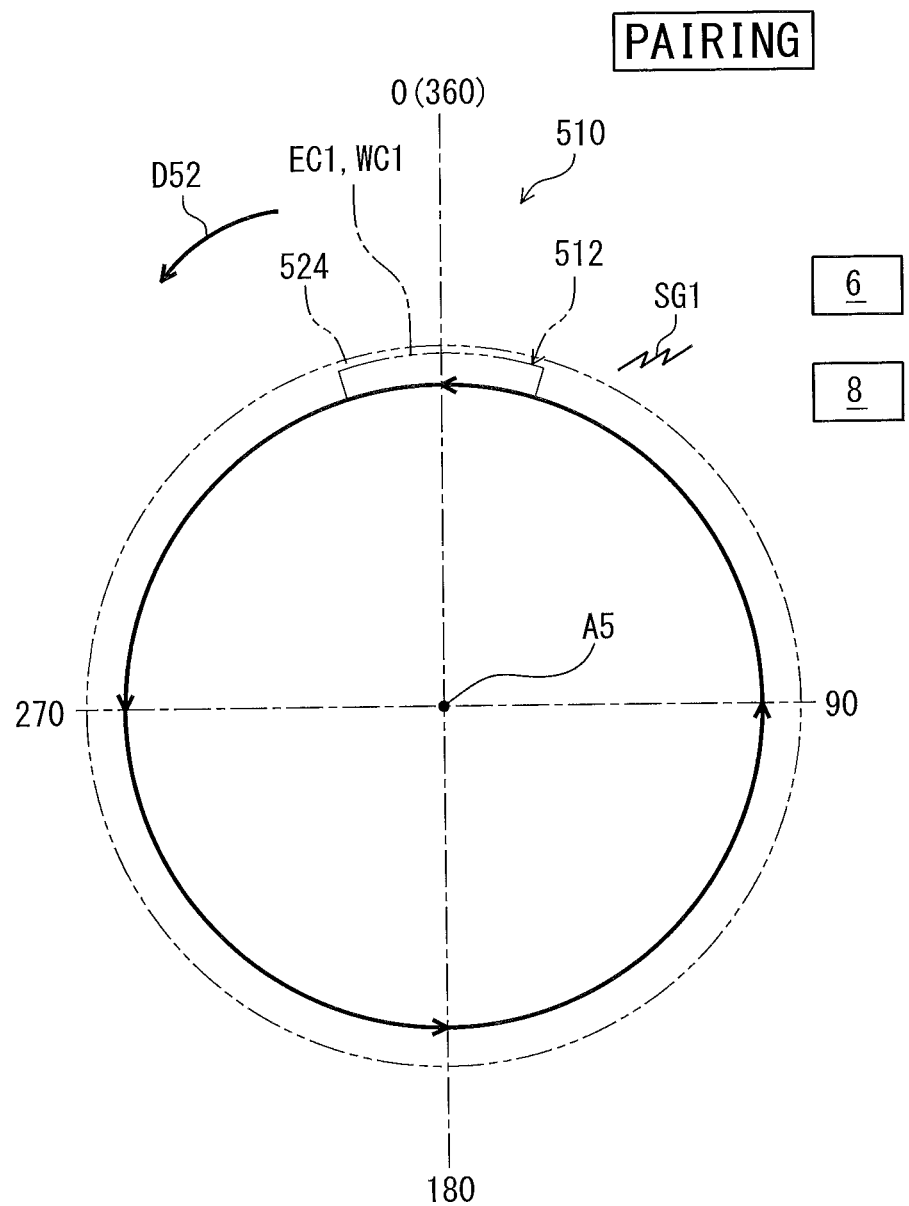
FIG. 26 is a side-elevational view of the rotational device illustrated in FIG. 22 for showing reverse rotation.

As seen in FIG. 25, the electronic controller EC1 is configured to control the wireless communicator WC1 not to execute pairing in response to the normal rotation of the rotational device 510. As seen in FIG. 26, the electronic controller EC1 is configured to control the wireless communicator WC1 to execute pairing in response to the reverse rotation of the rotational device 510. The electronic controller EC1 is configured to control the wireless communicator WC1 to wirelessly transmit the pairing signal SG1 in response to the reverse rotation of the rotational device 510. The electronic controller EC1 is configured to control the wireless communicator WC1 to wirelessly transmit the advertisement signal at advertising intervals in response to the reverse rotation of the rotational device 510.

The electronic controller EC1 is configured to control the wireless communicator WC1 to execute pairing in a case where the amount of reverse rotation AR of the rotational device 510 is greater than or equal to the rotation threshold TR. The electronic controller EC1 is configured to control the wireless communicator WC1 to execute pairing in a case where the amount of reverse rotation AR of the rotational device 510 is greater than or equal to the rotation threshold TR before the determination time DT1 elapses.

The electrical device 512 executes the pairing process described in each of the first embodiment and the modifications thereof referring to FIGS. 4 to 8. The description regarding the pairing process executed by the electrical device 12 can be utilized as the description regarding the pairing process executed by the electrical device 512 by replacing the reference numeral "10" and "12" with "510" and "512." Thus, the description regarding the pairing process of the electrical device 512 will not be described in detail here for the sake of brevity.

Sixth Embodiment

A rotational device 610 in accordance with a sixth embodiment will be described below referring to FIGS. 27 and 28. The rotational device 610 has the same structure as those of the rotational device 10 except that the force sensor 32 is omitted. Thus, elements having substantially the same structure as those in the first embodiment will be numbered the same here and will not be described or illustrated again in detail here for the sake of brevity.

Figure 27:
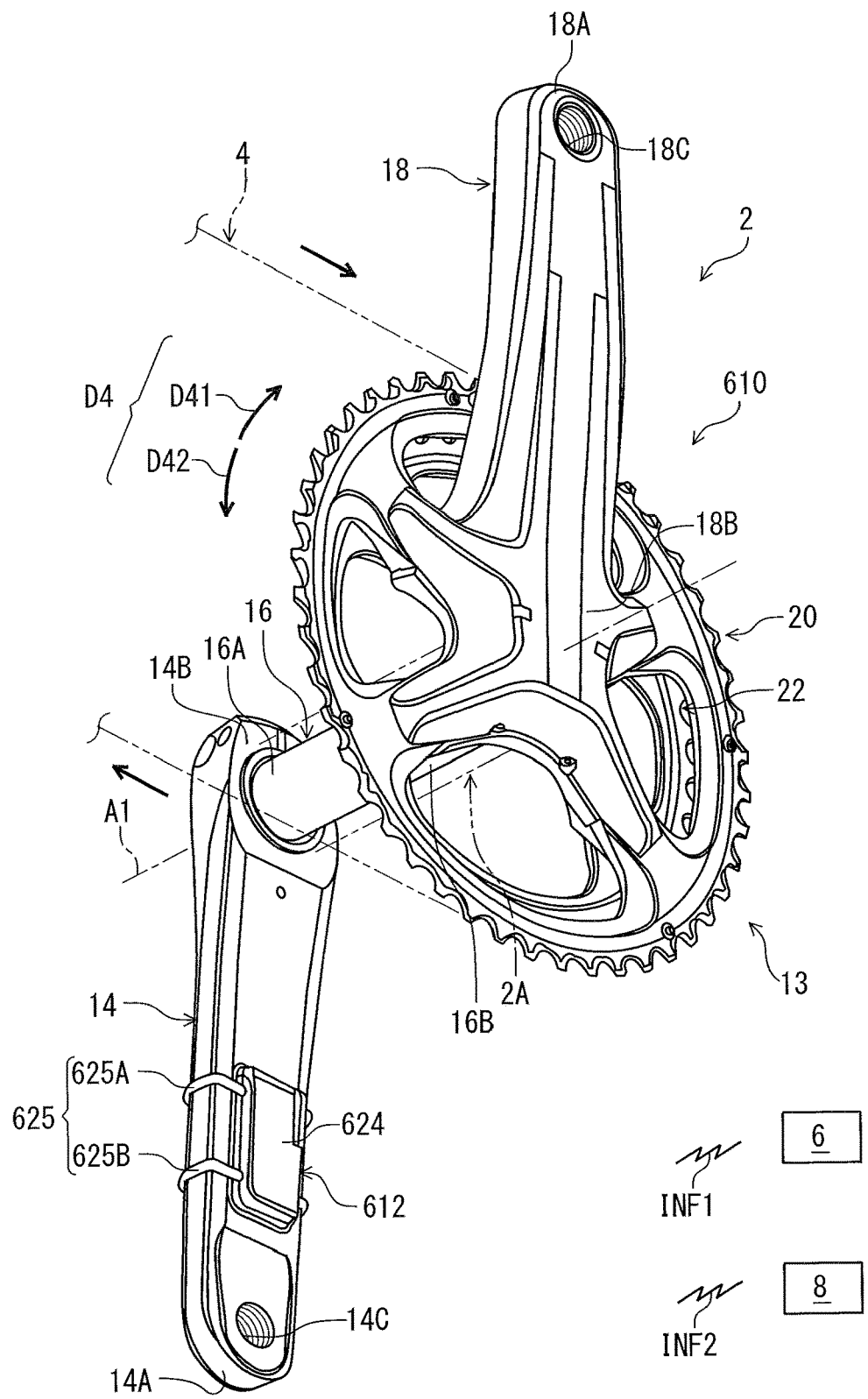
FIG. 27 is a side-elevational view of a rotational device in accordance with a sixth embodiment.
Figure 28:
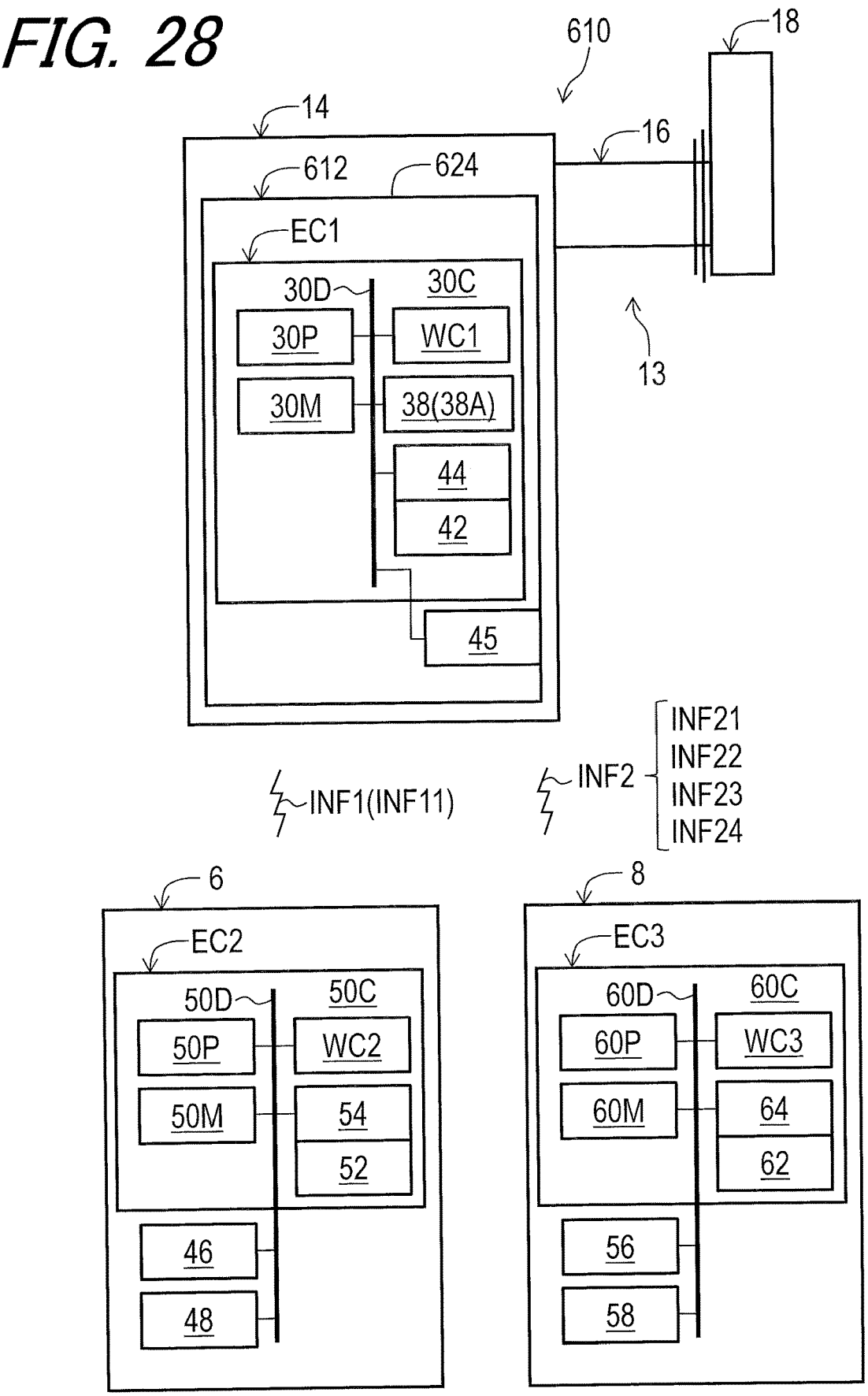
FIG. 28 is a schematic block diagram of the rotational device illustrated in FIG. 27.

As seen in FIGS. 27 and 28, the rotational device 610 comprises the crank arm 14, the crank arm 18, and the crank axle 16. The rotational device 610 of the human-powered vehicle 2 comprises an electrical device 612. The electrical device 612 has substantially the same structure as the structure of the electrical device 12 of the first embodiment. The electrical device 612 of the rotational device 610 for the human-powered vehicle 2 comprises the wireless communicator WC1 and the electronic controller EC1. The electrical device 612 further comprises the position sensor 38. The electrical device 612 is free of the force sensor 32. The electrical device 612 comprises the electric power source 42, the power-source holder 44, and the electric connector port 45. The force sensor 32 is omitted from the electrical device 612.

The electrical device 612 is at least partially provided to at least one of the crank axle 16, the crank arm 14, and the sprocket 20 or 22. The electrical device 612 is at least partially provided to the crank arm 14.

As seen in FIG. 28, the electrical device 612 is entirely provided to the crank arm 14. The electrical device 612 is coupled to the crank arm 14. However, the electrical device 612 can be at least partially provide to other parts of the rotational device 610 if needed or desired.

As seen in FIG. 27, the electrical device 612 comprises a housing 624 and an attachment member 625. The housing 624 is configured to be coupled to the crank arm 14 or 18 with the attachment member 625. The attachment member 625 include a first attachment part 625A and a second attachment part 625B. The wireless communicator WC1, the electronic controller EC1, the position sensor 38, the electric power source 42, and the power-source holder 44 are provided in the housing 624.

As seen in FIG. 28, the wireless communicator WC1 is configured to wirelessly transmit the rotational information INF1 relating to the rotational device 610. The rotational information INF1 includes at least one of: power applied to the rotational device 610; a deformation amount of the rotational device 610; a force applied to the rotational device 610; torque applied to the rotational device 610; a rotational position of the rotational device 610; and a rotational speed of the rotational device 610.

In the present embodiment, the rotational information INF1 includes the rotational speed INF12 of the rotational device 610. The rotational speed INF12 is a total number of rotations of the rotational device 610 per unit time. The rotational speed INF12 includes a cadence in a case where the rotational device 610 includes the crank arm 14.

The electronic controller EC1 is configured to control the wireless communicator WC1 to wirelessly transmit the power INF11 obtained based on the deformation amount sensed by the force sensor 32. The electronic controller EC1 is configured to control the wireless communicator WC1 to wirelessly transmit the rotational speed INF12 obtained based on the radial acceleration AL1 and the rotational acceleration AL2 sensed by the position sensor 38.

As seen in FIG. 4, the electronic controller EC1 is configured to determine whether the rotational device 610 rotates in the reverse direction D42 based on the rotational position PS sensed by the position sensor 38. The electronic controller EC1 is configured to determine whether the rotational device 610 rotates in the reverse direction D42 based on the radial acceleration AL1 and the rotational acceleration AL2. The electronic controller EC1 is configured to determine whether the rotational device 610 rotates in the reverse direction D42 based on the rotational position PS obtained based on the radial acceleration AL1 and the rotational acceleration AL2.

The electronic controller EC1 is configured to obtain the amount of reverse rotation AR based on the radial acceleration AL1 and the rotational acceleration AL2. The electronic controller EC1 is configured to start to obtain the amount of reverse rotation AR of the rotational device 610 based on the radial acceleration AL1 and the rotational acceleration AL2 in a case where the electronic controller EC1 recognizes the reverse rotation of the rotational device 610.

As seen in FIG. 6, the electronic controller EC1 is configured to control the wireless communicator WC1 not to execute pairing in response to the normal rotation of the rotational device 610. As seen in FIG. 7, the electronic controller EC1 is configured to control the wireless communicator WC1 to execute pairing in response to the reverse rotation of the rotational device 610. The electronic controller EC1 is configured to control the wireless communicator WC1 to wirelessly transmit the pairing signal SG1 in response to the reverse rotation of the rotational device 610. The electronic controller EC1 is configured to control the wireless communicator WC1 to wirelessly transmit the advertisement signal at advertising intervals in response to the reverse rotation of the rotational device 610.

The electronic controller EC1 is configured to control the wireless communicator WC1 to execute pairing in a case where the amount of reverse rotation AR of the rotational device 610 is greater than or equal to the rotation threshold TR. The electronic controller EC1 is configured to control the wireless communicator WC1 to execute pairing in a case where the amount of reverse rotation AR of the rotational device 610 is greater than or equal to the rotation threshold TR before the determination time DT1 elapses.

The electrical device 612 executes the pairing process described in each of the first embodiment and the modifications thereof referring to FIGS. 4 to 8. The description regarding the pairing process executed by the electrical device 12 can be utilized as the description regarding the pairing process executed by the electrical device 612 by replacing the reference numeral "10" and "12" with "610" and "612." Thus, the description regarding the pairing process of the electrical device 612 will not be described in detail here for the sake of brevity.

Figure 29:
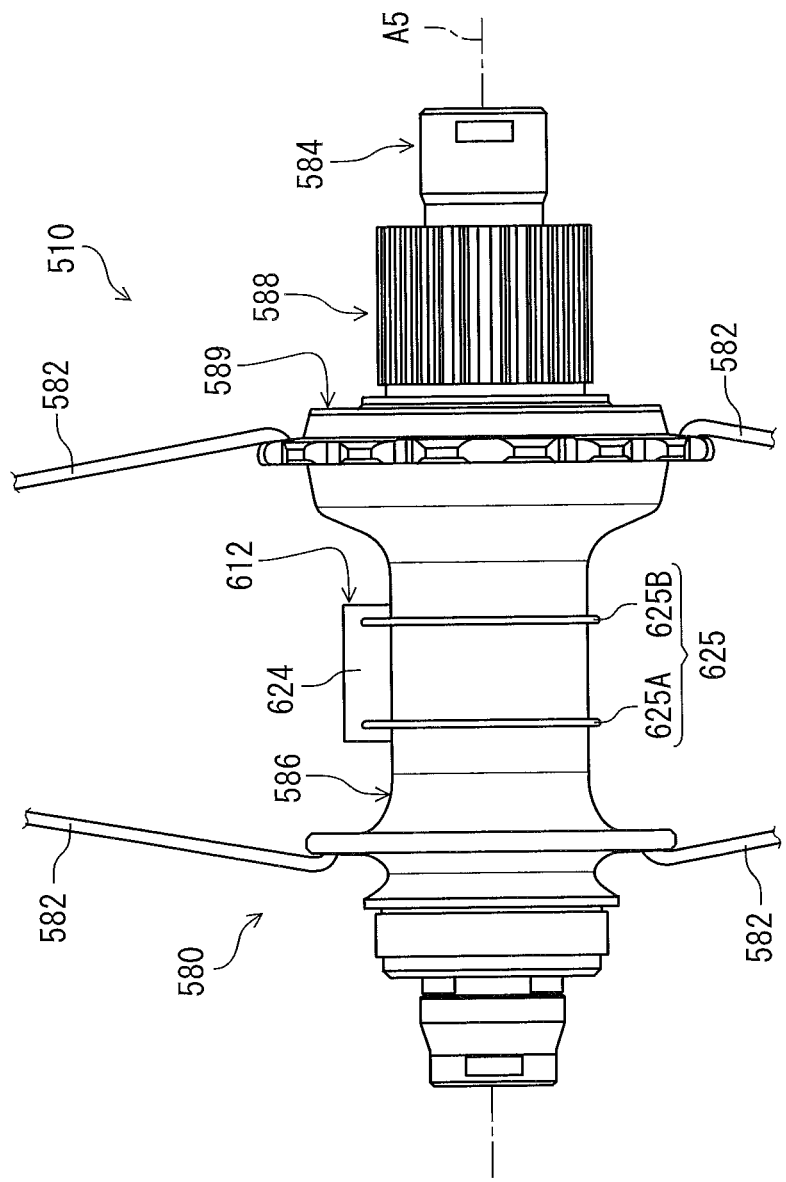
FIG. 29 is a side-elevational view of a rotational device in accordance with a modification.
Figure 30:
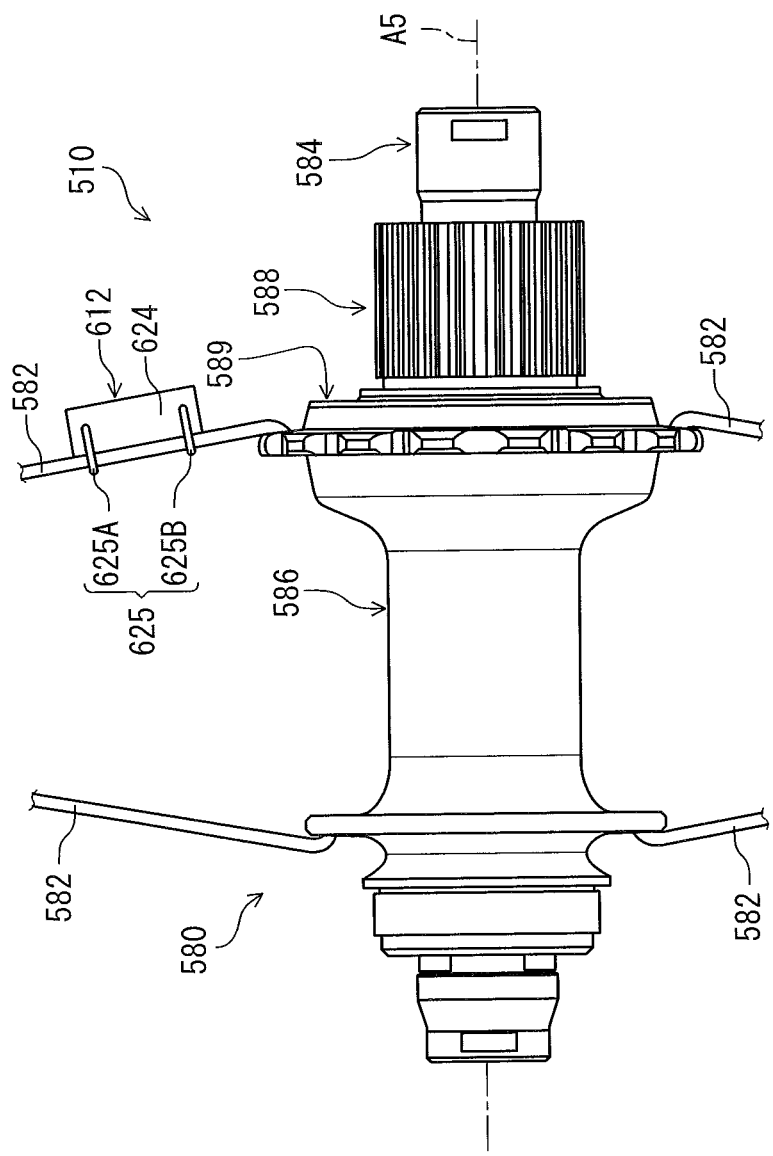
FIG. 30 is a side-elevational view of a rotational device in accordance with a modification.

As seen in FIGS. 29 and 30, the electrical device 612 can be provided to the hub assembly 580 of the rotational device 510 if needed or desired. As seen in FIG. 29, the electrical device 612 can be attached to the hub body 586 of the hub assembly 580. As seen in FIG. 30, the electrical device 612 can be provided to one of the at least two spokes 582 of the hub assembly 580 if needed or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An electrical device of a rotational device for a human-powered vehicle, comprising:
a wireless communicator configured to wirelessly communicate with an additional electrical device; and
an electronic controller electrically connected to the wireless communicator to wirelessly communicate with the additional electrical device via the wireless communicator, the electronic controller being configured to control the wireless communicator to execute pairing in response to a reverse rotation of the rotational device for the human-powered vehicle, the reverse rotation being an opposite direction of a driving rotational direction of the rotational device.

2. The electrical device according to claim 1, wherein the electronic controller is configured to control the wireless communicator to execute pairing in a case where an amount of reverse rotation of the rotational device is greater than or equal to a rotation threshold.

3. The electrical device according to claim 2, wherein the electronic controller is configured to control the wireless communicator to execute pairing in a case where the amount of reverse rotation of the rotational device is greater than or equal to the rotation threshold before a determination time elapses.

4. The electrical device according to claim 1, further comprising
a position sensor configured to sense a rotational position of the rotational device.

5. The electrical device according to claim 4, wherein
the electronic controller is electrically connected to the position sensor to obtain the rotational position sensed by the position sensor.

6. The electrical device according to claim 4, wherein
the electronic controller is configured to determine whether the rotational device rotates in a reverse direction based on the rotational position sensed by the position sensor.

7. The electrical device according to claim 4, wherein
the position sensor includes an accelerometer,
the accelerometer is configured to sense
radial acceleration defined in a radial direction with respect to a rotational axis of the rotational device, and
rotational acceleration defined in a rotational direction with respect to the rotational axis, and
the electronic controller is configured to determine whether the rotational device rotates in a reverse direction based on the radial acceleration and the rotational acceleration.

8. The electrical device according to claim 7, wherein
the electronic controller is configured to obtain the rotational position based on the radial acceleration and the rotational acceleration which are sensed by the accelerometer, and
the electronic controller is configured to determine whether the rotational device rotates in the reverse direction based on the rotational position obtained based on the radial acceleration and the rotational acceleration.

9. The electrical device according to claim 7, wherein
the electronic controller is configured to obtain an amount of reverse rotation of the rotational device based on the radial acceleration and the rotational acceleration.

10. The electrical device according to claim 9, wherein
the electronic controller is configured to start to obtain the amount of reverse rotation of the rotational device based on the radial acceleration and the rotational acceleration in a case where the electronic controller recognizes the reverse rotation of the rotational device.

11. The electrical device according to claim 1, wherein
the electronic controller is configured to control the wireless communicator to wirelessly transmit a pairing signal in response to the reverse rotation of the rotational device.

12. The electrical device according to claim 11, wherein
the pairing signal includes an advertisement signal, and
the electronic controller is configured to control the wireless communicator to wirelessly transmit the advertisement signal at advertising intervals in response to the reverse rotation of the rotational device.

13. A rotational device of a human-powered vehicle, comprising:
a crank arm; and
an electrical device comprising:
a wireless communicator configured to wirelessly communicate with an additional electrical device; and
an electronic controller electrically connected to the wireless communicator to wirelessly communicate with the additional electrical device via the wireless communicator, the electronic controller being configured to control the wireless communicator to execute pairing in response to a reverse rotation of the rotational device, the reverse rotation being an opposite direction of a driving rotational direction of the rotational device.

14. The rotational device according to claim 13, wherein
the electrical device is at least partially provided to the crank arm.

15. The rotational device according to claim 13, further comprising:
a crank axle; and
a sprocket, wherein
the crank arm is secured to the crank axle.

16. The rotational device according to claim 15, wherein
the electrical device is at least partially provided to at least one of the crank axle, the crank arm, and the sprocket.

17. A rotational device for a human-powered vehicle, comprising:
a pedal axle;
a pedal body rotatably coupled to the pedal axle; and
an electrical device comprising:
a wireless communicator configured to wirelessly communicate with an additional electrical device; and
an electronic controller electrically connected to the wireless communicator to wirelessly communicate with the additional electrical device via the wireless communicator, the electronic controller being configured to control the wireless communicator to execute pairing in response to a reverse rotation of the rotational device, the reverse rotation being an opposite direction of a driving rotational direction of the rotational device.

18. The rotational device according to claim 17, wherein
the electrical device is at least partially provided to at least one of the pedal axle and the pedal body.

19. The electrical device according to claim 1, wherein
the reverse rotation of the rotational device triggers the electronic controller to control the wireless communicator to execute pairing.

* * * * *